(12) United States Patent
Crawford et al.

(10) Patent No.: US 11,854,200 B2
(45) Date of Patent: Dec. 26, 2023

(54) SKIN ABNORMALITY MONITORING SYSTEMS AND METHODS

(71) Applicant: SkinIO, LLC, Chicago, IL (US)

(72) Inventors: Kyoko Crawford, Chicago, IL (US); Arthur Morrissette, Chicago, IL (US)

(73) Assignee: SkinIO, Inc., Chicago, IL (US)

( * ) Notice: Subject to any disclaimer, the term of this patent is extended or adjusted under 35 U.S.C. 154(b) by 53 days.

(21) Appl. No.: 17/075,336

(22) Filed: Oct. 20, 2020

(65) Prior Publication Data

US 2021/0104043 A1 Apr. 8, 2021

Related U.S. Application Data

(63) Continuation-in-part of application No. 16/513,681, filed on Jul. 16, 2019, now abandoned, which is a
(Continued)

(51) Int. Cl.
*G06K 9/00* (2022.01)
*G06T 7/00* (2017.01)
(Continued)

(52) U.S. Cl.
CPC .......... *G06T 7/0014* (2013.01); *G06T 7/0012* (2013.01); *G06T 7/60* (2013.01);
(Continued)

(58) Field of Classification Search
CPC ......... G06T 7/0012; G06T 2207/20081; G06T 7/11; G06T 2207/10081; G06T 11/003; G06T 11/60; G06T 2200/24; G06T 2207/10088; G06T 2207/10104; G06T 2207/10116; G06T 2207/10132; G06T 2207/30004; G06T 2207/30061; G06T 2207/30068; G06T 7/0016; G06T 2207/20084; G06T 2207/30088; G06T 2207/30096; G06T 2207/10024; G06T 2207/10056; G06T 2207/30024; G06T 7/0014; G06T 1/0021; G06T 7/12;
(Continued)

(56) References Cited

U.S. PATENT DOCUMENTS

2011/0218428 A1\* 9/2011 Westmoreland ......... A61B 6/00
600/425

OTHER PUBLICATIONS

Guo, Deep CNN Ensemble with Data Augmentation for Object Detection, Jun. 2015, arXiv (Year: 2015).\*
(Continued)

*Primary Examiner* — Alex Kok S Liew
(74) *Attorney, Agent, or Firm* — K&L Gates LLP

(57) ABSTRACT

A process for assessing image quality metrics includes the steps of receiving image data from an image capture device, wherein the image data includes a skin portion; extracting, via a machine learning system, a first set of information from the image data; extracting, via the machine learning system, a second set of information from the image data; scoring the first and second sets of information of the image data to reflect image quality metrics; identifying a threshold score reflecting acceptable image quality metrics; when the score is greater than the threshold score, submit the image data; and when the score is less than the threshold score, prompt the user to retake the image data.

4 Claims, 28 Drawing Sheets

Related U.S. Application Data continuation of application No. 15/726,367, filed on Oct. 5, 2017, now Pat. No. 10,354,383.

(60) Provisional application No. 62/441,101, filed on Dec. 30, 2016.

(51) Int. Cl.
*G06T 7/60* (2017.01)
*G06T 11/60* (2006.01)
*G06T 5/20* (2006.01)
*G06T 7/90* (2017.01)

(52) U.S. Cl.
CPC ............ *G06T 11/60* (2013.01); *G06T 5/20* (2013.01); *G06T 7/90* (2017.01); *G06T 2207/20081* (2013.01); *G06T 2207/20084* (2013.01); *G06T 2207/30088* (2013.01); *G06T 2207/30096* (2013.01); *G06T 2210/22* (2013.01)

(58) Field of Classification Search
CPC . G06T 1/20; G06T 11/00; G06T 2207/30048; G06T 2207/30101; G06T 7/90; G06T 2207/20076; G06T 2207/20152; G06T 5/005; G06T 7/149; G06T 7/187; G06T 2207/10016; G06T 2207/20016; G06T 2207/20021; G06T 2207/20036; G06T 2207/20064; G06T 2207/30104; G06T 7/0002; G06T 7/136; G06T 7/143; G06T 7/155; G06T 7/246; G06T 7/37; G06T 7/62; G06T 7/70; G06T 11/206; G06T 13/00; G06T 13/40; G06T 13/80; G06T 2207/10072; G06T 2207/10101; G06T 2207/20024; G06T 2207/20072; G06T 2207/20116; G06T 2207/20221; G06T 5/002; G06T 5/006; G06T 5/30; G06T 7/001; G06T 7/13; G06T 7/44; G06T 7/73; G06T 7/77

See application file for complete search history.

(56) References Cited

OTHER PUBLICATIONS

Al-Amin, Detection of Cancerous and Non-cancerous Skin by using GLCM Matrix and Neural Network Classifier, Dec. 2015, International Journal of Computer Applications (Year: 2015).*

* cited by examiner

SKIN ABNORMALITY MONITORING SYSTEMS AND METHODS

CROSS-REFERENCE TO RELATED APPLICATIONS

This application is a continuation-in-part of U.S. application Ser. No. 16/513,681 filed Jul. 16, 2019, which is a continuation of U.S. application Ser. No. 15/726,367 filed Oct. 5, 2017, which incorporates by reference and claims the benefit of priority to U.S. Provisional Application No. 62/441,101 filed on Dec. 30, 2016, the disclosures of which are incorporated by reference in their entireties.

BACKGROUND OF THE INVENTION

The present application relates generally to systems and methods associated with the capture and processing of images of skin, and more particularly to tracking changes in skin over time.

The skin is the largest organ on the human body. And in recent years, cancer of the skin, specifically melanoma, is on the rise. The challenge of fighting skin cancer in patients is not the lack of a cure, but the lack of early detection. Checking skin regularly through skin cancer screening and skin health monitoring, either at a patient's home or at a physician's office, can be essential for detecting skin cancer early enough to effectively treat a tumor.

Detection and diagnosis of melanoma typically has relied on visual inspection by a patient or his/her physician or dermatologist, biopsy of anomalous moles or regions of the skin, and surgery to remove tumors found to be cancerous, followed in some cases by radiation treatment, immunotherapy, chemotherapy or the like.

Various systems and methods have been developed for use in early detection of skin cancer. Although these systems and methods provide for a solution in delivering earlier detection, a problem exists in that the early detection procedure is traditionally done through visual means only, lacks a formalized, data-driven control, and lacks a follow-up protocol inherent in detecting changes in the size, shape, color, location, and other characteristics of a mole or skin anomaly which could indicate the presence of skin cancer on a patient's skin. Additionally, systems and methods have been developed using expensive, large, proprietary devices, cumbersome machinery, the use of multiple camera setups, full-body image scans and various other solutions which can present various barriers to a patient and physician alike to performing rigorous early detection procedures and which may be cost-prohibitive and less persistent than desired.

Consumers of programs, devices, and methods for early detection of skin cancer would be desirous of systems and methods for improved skin image capture and processing which can be used by both patients and physicians in the early detection process and to support the history and evolution of skin over time. It would be desirable to provide systems and methods for early detection of skin cancer which can be performed using readily available technology including the processors within already existing mobile phones and tablets coupled together with cloud-based computer processors, memory and instructions. Thus, there is a need to create new and useful systems and methods for skin image capture and processing.

In recent years, state-of-the-art performance across many computer vision applications has been achieved using deep learning and deep neural networks. Within deep neural network models, each level of the model learns to transform the input data into an increasingly abstract representation.

Deep neural networks may contain millions of parameters that are impossible to optimize by hand. Instead, to optimize these parameters or train the neural network, large amounts of labeled data are provided to the model and the model slowly learns the parameters through trial and error as it attempts to identify the desired features of the data in a process called deep learning. While deep neural networks can be extremely powerful models for many applications, the performance is strongly dependent on the amount and quality of data available to train the model. For applications where existing data is limited, a deep learning process known as "transfer learning" may be used. Transfer learning utilizes a network pre-trained on a general image classification task and can be fine-tuned on a different, smaller sample of data to perform a related task. Recently deep learning has achieved across computer vision applications such as image classification, object detection, and even image quality assessment.

Image quality assessment (IQA) is a computer vision application that aims to predict the subjective quality of an image. In addition to the overall quality of an image, IQA applications may focus on specific aspects of image quality including brightness, color, contrast, sharpness, and content. One of the main difficulties of teledermatology is the reliance on the patient's ability to take good or sufficient quality images. While the diagnostic accuracy in teledermatology has increased with the improved resolution of mobile phone cameras and newer camera features such as high dynamic range (HDR) and auto-focus, consistent image quality remains a concern. Relying on clinician feedback to improve the quality of patient photographs can be a slow, costly process that still does not guarantee high-quality images.

Accordingly, there is a need for sequential/repeatable skin image capture and methods for tracking changes between temporally distinct images of skin, as described herein.

BRIEF SUMMARY OF THE INVENTION

To meet the needs described above and others, the present disclosure provides systems and methods for skin image capture and processing. Specifically, the present disclosure provides a skin abnormality monitoring system for tracking changes between temporally distinct images of skin.

All or part of the systems and methods described herein may be implemented in a computer system which includes a set of instructions stored on one or more non-transitory machine-readable storage media and/or memory and executable on one or more processing devices. All or part of the systems and methods described herein may be implemented as an apparatus, method or system which may include one or more processing devices and memory which stores executable instructions to implement the example functions.

The details of illustrative aspects of the specification are set forth in the description and drawings below. These aspects are but a few of the ways in which the principles laid out in the specification may be employed in illustrative embodiments. Other advantages, features and objects will be apparent from the description, drawings and claims.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

Like reference symbols in the various figures indicate like elements.

DETAILED DESCRIPTION OF THE INVENTION

Figure 1:
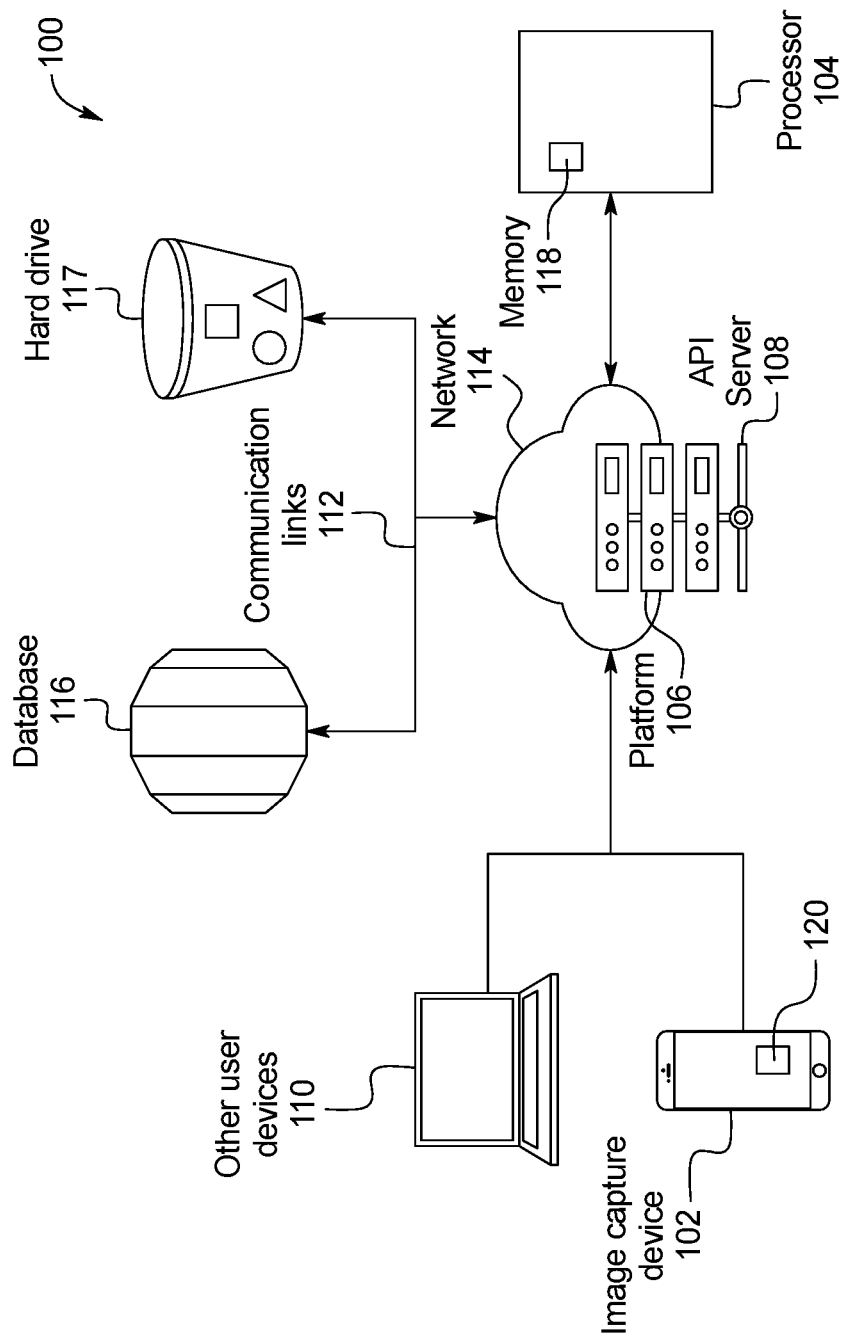
FIG. 1 is a schematic representation of a skin abnormality monitoring system, according to an example embodiment.

FIG. 1 illustrates an exemplary skin abnormality monitoring system 100. In these exemplary embodiments, improved systems and methods for monitoring skin abnormalities are used to detect skin anomalies such as the appearance of and/or change in a mole for the early detection of skin cancer, specifically, but not limited to, melanoma. An aspect of some embodiments relates to a method and system by which a physician (with or without a technician) and a patient work to capture multiple photographs of a patient's skin using an image capture device, with one or more reference points marked on a patient's skin in each of the captured photographs. The process of capturing images of the skin continues until an entire region of the patient's body is acquired.

Referring to FIG. 1, the skin abnormality monitoring system 100 may include an image capture device 102, such as a tablet or mobile device used to capture photos or images of the patient's skin, in communication with a processor 104 that is integrated with or provides a platform 106 for healthcare providers and patients to create and share images, data, and other information. An application programming interface (API) server 108 is also used to organize data and information. The API server 108 communicates with a database 116 and/or hard drive 117 that stores data such as images. Healthcare professionals and other users may also access the platform 106 through one or more other user devices 110. Wired or wireless communication links 112 may relay communication across a network 114 such as the internet. For example, in one embodiment, communication links between the image capture device 102, the other user devices 110, and the API server 108 may be wireless, while the communication links between the database 116, the hard drive 117, and the API server 108 may be wired.

The processor 104 includes a memory 118 configured to store program instructions executable by the processor 104 to perform a method 200 of processing and analyzing skin maps of a patient as described below. The skin abnormality monitoring system 100 may also include a mobile application 120 installed on the image capture device 102 that permits the user to submit images and other information to the platform 106. The platform 106 may provide its functionality through the mobile application 120 or a website on the image capture device 102 or other user devices 110.

Figure 2:
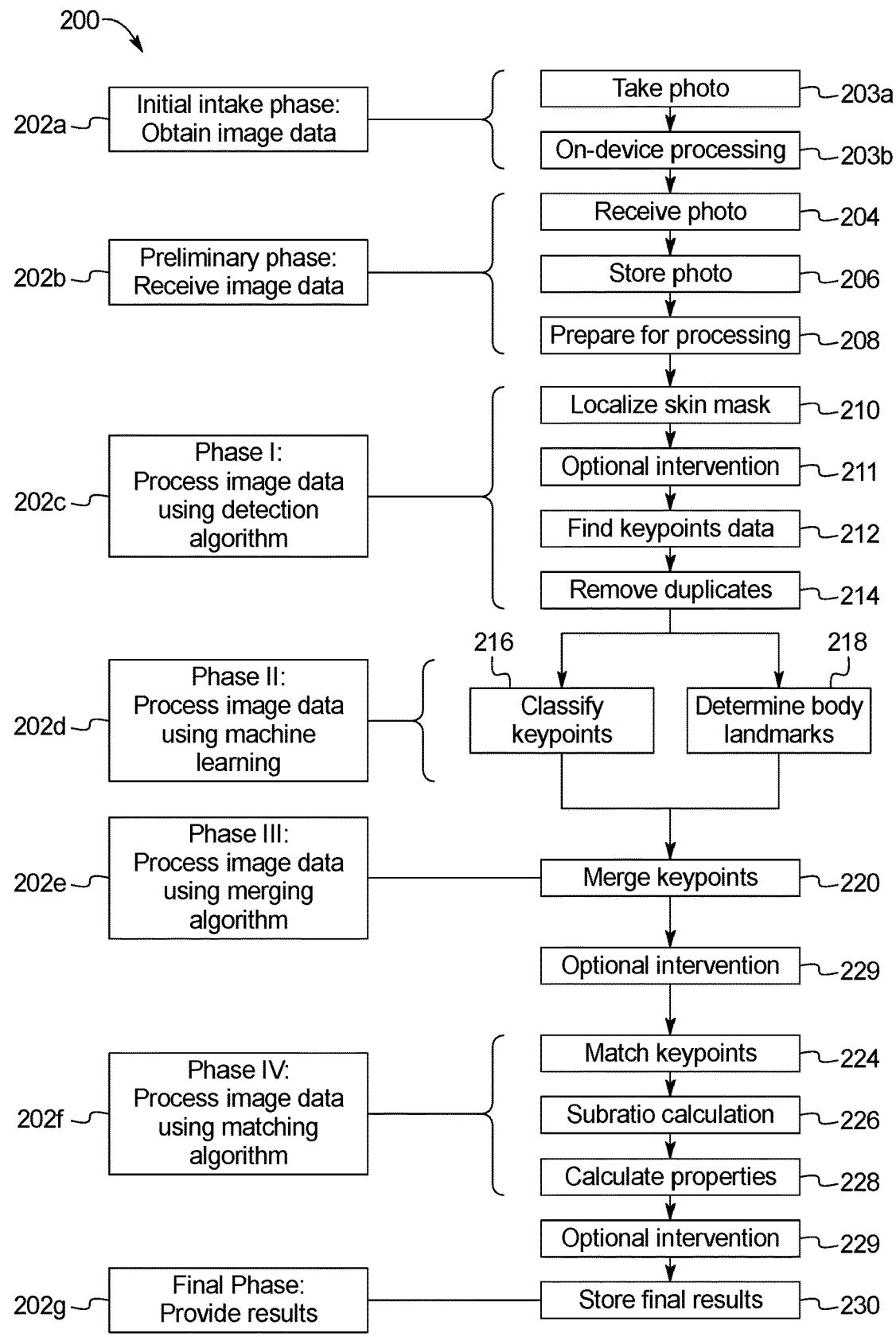
FIG. 2 is a flowchart of an example sequence of steps of the skin abnormality monitoring system of FIG. 1.

FIG. 2 illustrates an example method 200 of processing and analyzing skin maps of a patient. In one embodiment, the method 200 of processing and analyzing skin maps of a patient can be implemented using Java or a similar computer programming language for carrying out the functions on images of the skin as described below. The embodiment illustrated in FIG. 2 includes a plurality of phases 202a-202g, each including one or more steps of the method 200. Further, in some embodiments, the method 200 periodically includes optional intervention steps that allow select portions of the method to be rerun. This modular approach enables the user or system administrator to focus on specific portions of the method, such as skin mask localization or merging of the keypoints, so that data can be verified or algorithms can be run multiple times with different manually-input constants. By breaking the method into steps that can be rerun, the system provides flexibility to ensure that the analysis is on track without affecting the entirety of the system.

At the Initial Intake Phase 202a, a user takes a photo using the image capture device 102 in step 203a. Images can be acquired using standard tablets, mobile devices or other such input devices with a camera or camera functionality attached. In one embodiment of on-device processing in step 203a, the skin abnormality monitoring system 100 utilizes deep neural network models optimized to run on mobile devices to automatically assess and screen patient images prior to clinician review.

A neural network consists of multiple processing layers with neuron nodes that represent input, latent, and output data and are constructed to mimic the process of neuron activation and signal triggering in the human brain. Using weights (or parameters) that define the activation functions that transfer information across the network, neural networks can solve complicated tasks such as image and speech recognition.

The neural network models used for image quality assessment are trained to identify image quality using manually-labeled dermatological image data with varying quality levels as well as synthetically modified high-quality images to mimic common photograph distortions. In some exemplary embodiments, clinicians may provide additional feedback on the quality of the images which is incorporated into the training of the neural network model. For example, the image quality screening may be specifically tailored to be more strict or lenient based on the provider's or clinician's specific preferences.

Figure 3A:
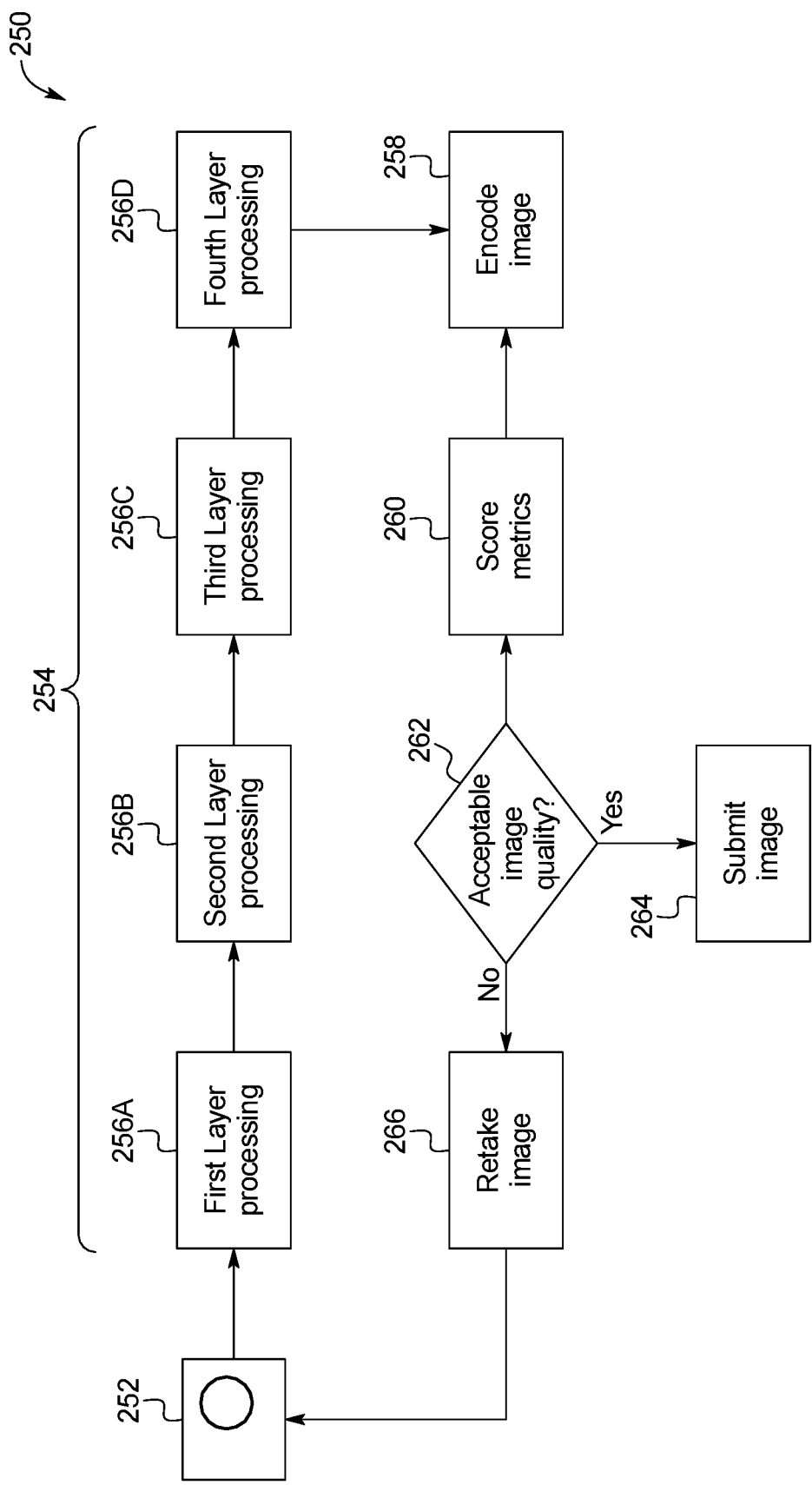
FIG. 3A is a block diagram of an example method for neural network modeling to assess image quality.

In step 203b, the image data is first processed through an image quality assessment method 250 detailed in FIG. 3A. In an example embodiment, the image is first cropped to isolate the area of interest before entering the neural network 254 in step 252. In step 256A, the image is processed through the first representational layer of the neural network 254 to extract low-level image features such as pixel colors and edges. The image is then process through the next layers to extract information such as how the colors and edges are arranged in steps 256B, 256C, 256D. The subsequent layers gather increasingly abstract information about the image context. The system 100 therefore learns to recognize high level features within the image. The neural network model 254 may include any number of layers for additional processing in steps 256A-256N, modifying or adjusting the number based on the amount of information being extracted from the image. In step 258, the system encodes the image to a low-dimensional representation. The system 100 then calculates scores for various quality metrics such as but not limited to color, brightness, focus, and contrast in step 260.

In step 262, the system 100 determines whether the image is of sufficient quality to submit for review. In one embodiment, the system 100 identifies a threshold score reflecting acceptable image quality metrics. When the score is greater than the threshold score, the system 100 then submits the image data for further processing and/or to the clinician. When the score is less than the threshold score, the system 100 then prompts the user to retake the image data. The threshold score may be calculated using other metrics, such as minimum requirements from the clinician and/or metrics developed using the neural network model. Use of the scores also allows the system 100 to provide detailed feedback to the patient on how to improve image quality.

The models are optimized to be small and fast enough to run on mobile devices instead of remote servers. The feedback on image quality is provided instantly, allowing the patient to quickly retake poor quality images. Avoiding the use of remote servers also increases patient privacy as the quality analysis is performed on the images within the patient's personal device and not on a remote server.

During on-device processing in step 203b, a scaling element may be applied to the image that is used throughout processing to control scaling and alignment between temporal images. In one embodiment, the scaling element is a green dot applied to the subject who is photographed in the image. The size and the (x, y) coordinates of the green dot on the image are determined during on-device processing in step 203b. Pre-processing and analysis may be also performed on the device using mobile-specific versions of the processing libraries in step 203b. Each image is initially passed through a pre-processing step to reduce noise in the image and balance colors as well as contrast.

Next, Preliminary Processing Phase 202b includes a number of steps related to receiving image data from a user. The image data is sent from the image capture device 102 to the API server 108 in step 204. In step 206, the API server 108 passes the image data to the database 116 to store the image and prepare it for additional processing. For any given body region, multiple photographs or images can be captured at multiple distances from a patient to provide an overview, full-region skin image map as well as higher resolution photos of a particular body region. The Preliminary Processing Phase 202b may also include step 208 to prepare the image for processing.

In Phase I 202c, the computer processor 104 runs the image data through a detection algorithm to identify a skin map of the patient used to specify keypoints on the image through skin mask localization. Skin mask localization limits processing to only relevant parts of each image, thereby reducing overall computations and total processing time. This phase also reduces the number of detections to classify performed in later steps and provides the foundation for matching later in the process. Skin mask localization is designed to filter out noise and outline the skin in the image, as described below. Skin mask localization is designed using known constants empirically determined and with the knowledge of what shape should be found in each photo. The keypoints data is then sent to the API server 108. FIGS. 3-10 illustrate various features and methods utilized in Phase I 202c.

Figure 3B:
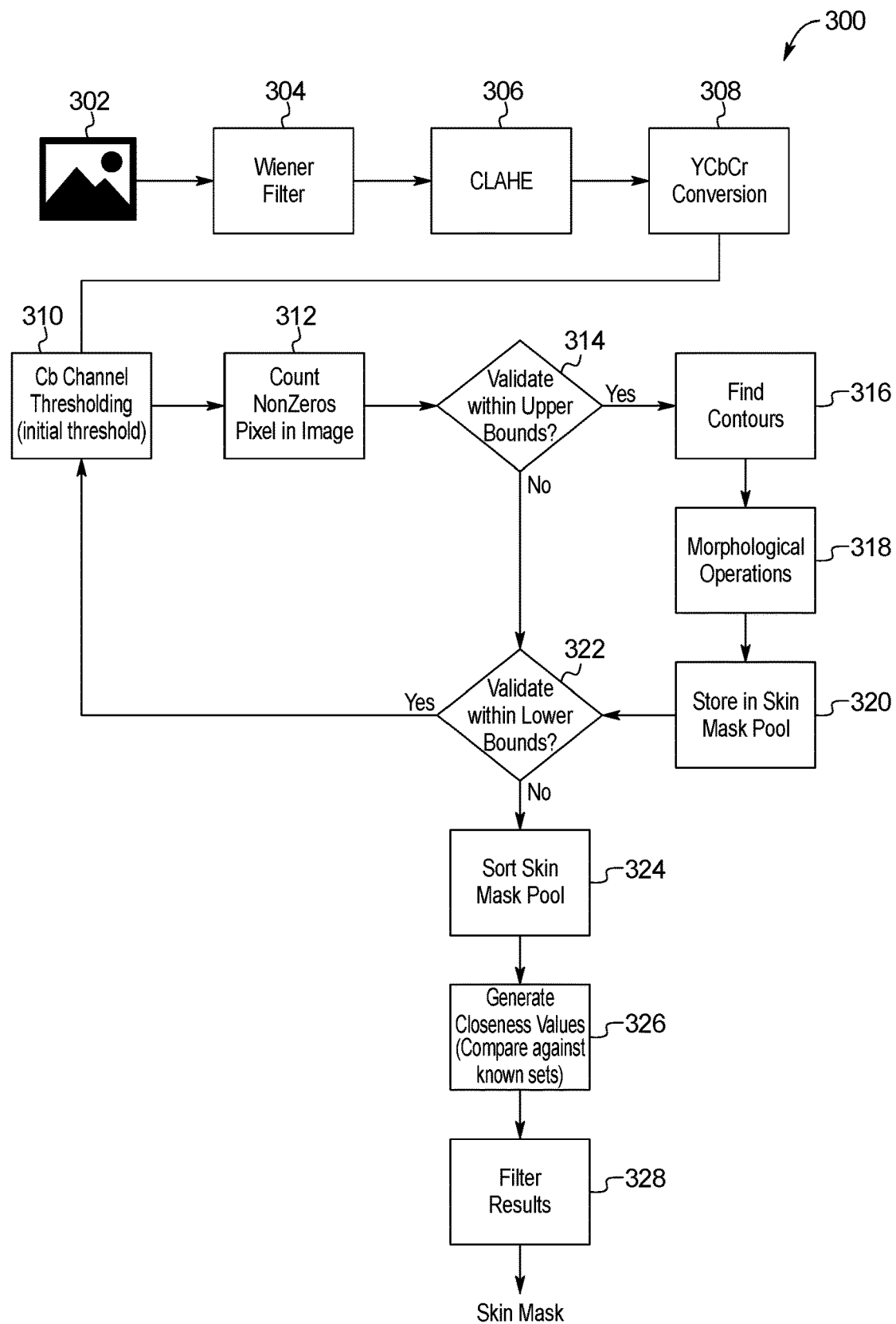
FIG. 3B is a block diagram of an example method for skin image localization of the skin abnormality monitoring system of FIG. 1.

In the step 210 of Phase I 202c, the image data is processed through a skin localization method 300 detailed in FIG. 3B. Before any attempt to detect moles and/or other skin anomalies, the skin of a patient is located within an image 302. The processor 104 may utilize an image processing library, such as the Open Source Computer Vision library (OpenCV) or other image processing tools, to detect and process the skin image. Skin localization prevents unnecessary analysis of background features within a captured image 302, such as hair, underwear, jewelry, background, and other irrelevant detections which may be captured within the image 302 together with the patient's skin. Skin localization within the image 302 may reduce the overall computation time on the skin image processing and the overall number of false-positives of detections of moles and/or other skin anomalies. The skin masks may also be used in the matching algorithm to stabilize matching as described below.

In a first step 304, a Wiener filter is applied to the input data of the captured image. A Contrast Limited Adaptive Histogram Equalization (CLAHE) is applied to the image in subsequent step 306 to improve the contrasts between the background and the skin. In step 308, the image 302 is converted from the RGB to YCbCr color channel as the skin is particularly distinguishable in the latter color space.

The Cb channel is extracted and is submitted to a threshold in step 310, after which the percentage of non-zero pixels on the picture is computed. In one embodiment, a threshold value of 120 is utilized to localize skin on the image. After the thresholding operation, the percentage of non-zero pixels on the picture is computed in step 312 and compared to upper validation conditions in step 314. If the conditions are met, the skin localization process 300 proceeds through to the next step 316. The skin contour is then detected using the findcontour function in OpenCV in step 316. This mask is smoothed using morphological operations such as closing and erosion in step 318. The skin mask is stored in a skin mask pool in step 320, and then compared to lower validation conditions in step 322. If the upper validation conditions of step 314 are met, the threshold value is increased until the low validation limit is met in step 322.

Steps 324-328 outline the steps for selecting the optimal skin mask by sorting and filtering potential skin masks. Each potential mask is compared to a known set of images previously generated for the given region, which represent the likely and expected shape of the correct skin mask. In step 324, the skin mask pool is sorted. In step 326, each skin mask in the pool is compared against all the images in the known set and a closeness value is generated for each comparison. The results are compared and filtered in step 328 to identify the best match. The best match is selected and returned as the skin mask for the photo provided.

Figure 4B:
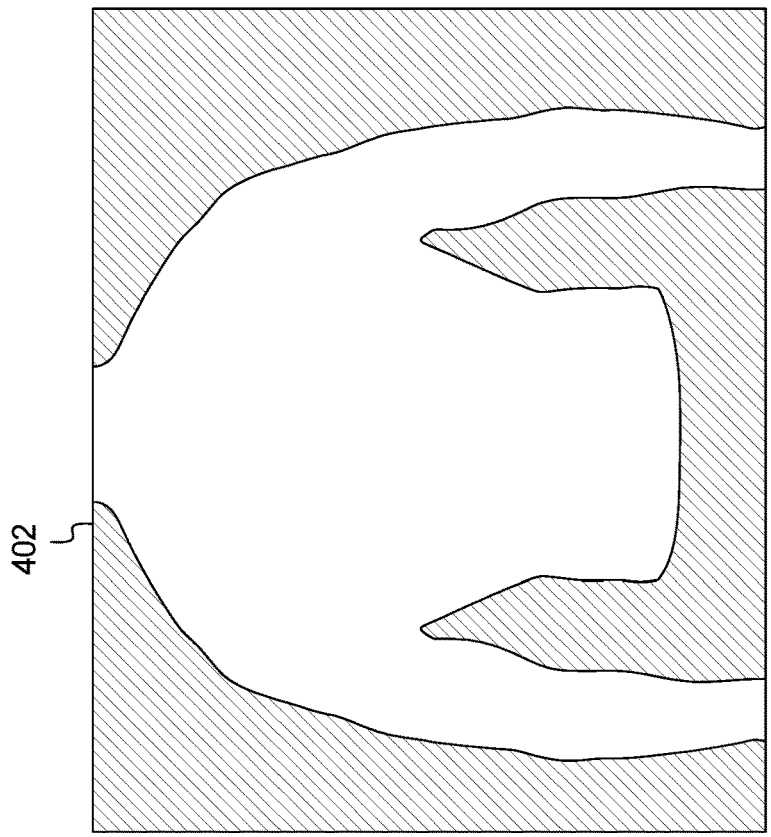
FIGS. 4A and 4B and FIGS. 5A and 5B show example input and output images of the method of FIG. 3B.
Figure 4A:
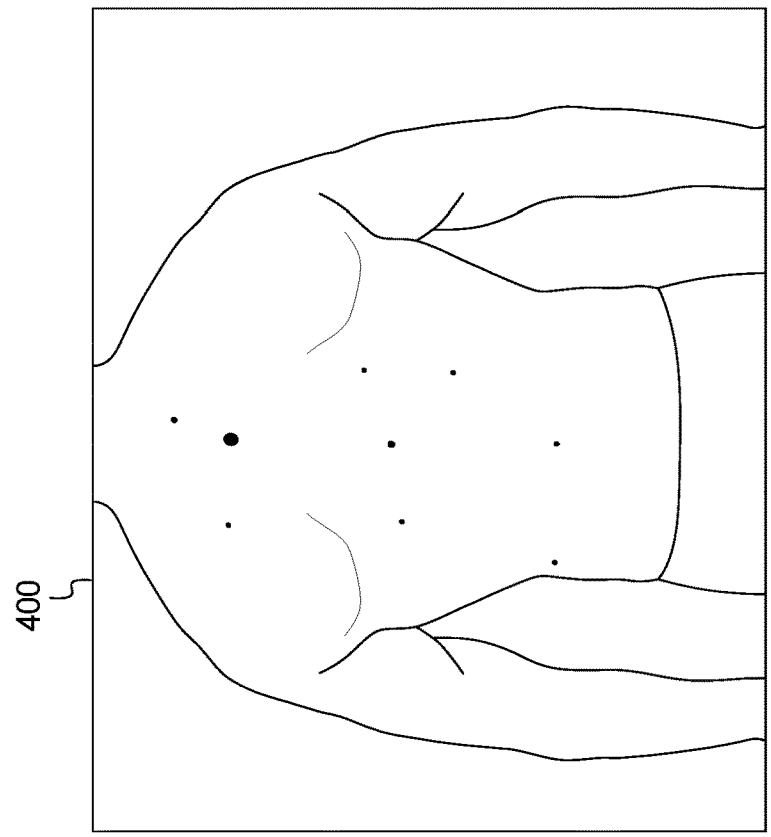
Figure 5B:
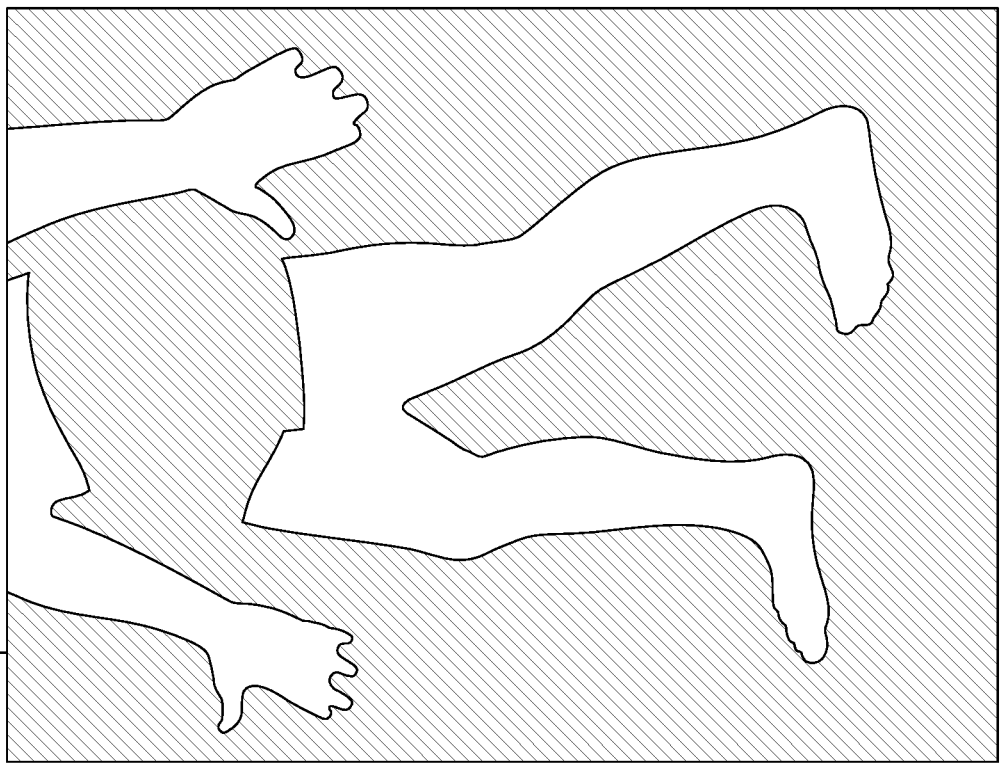
Figure 5A:
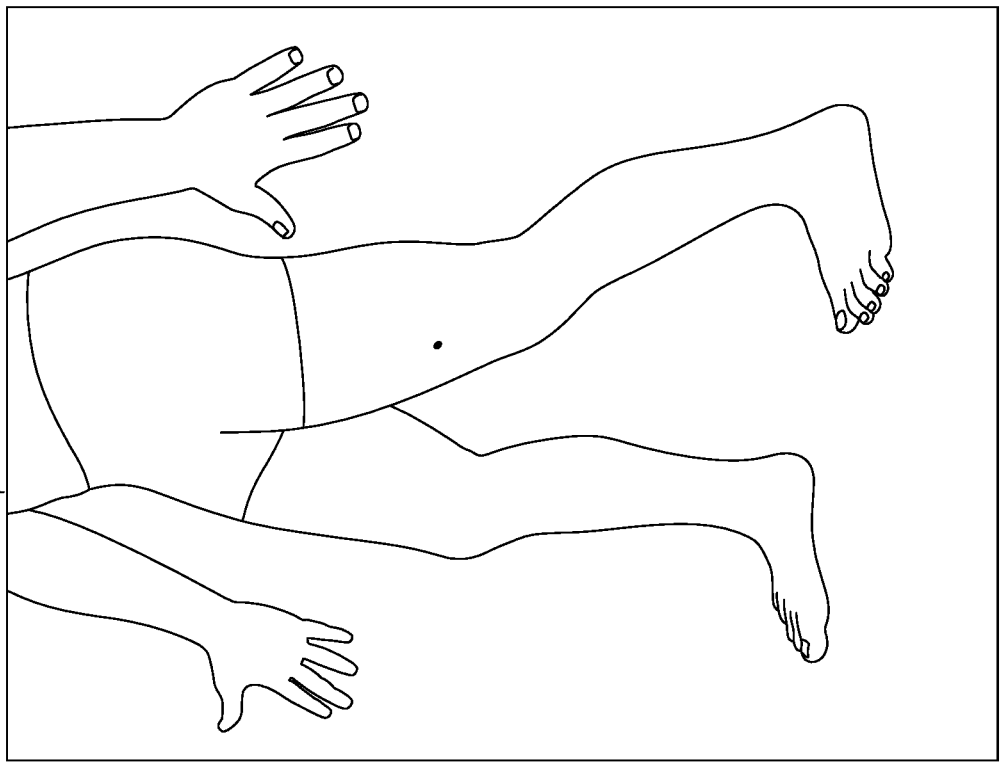

FIGS. 4 and 5 show example output results of the method and system of FIG. 3B. FIGS. 4A and 5A are example images 400 and 500, respectively, captured by the user device 102. Processing the images 400, 500 through the skin localization method 300 of FIG. 3B generates the images 402, 502 of FIGS. 4B and 5B, respectively.

Figure 6:
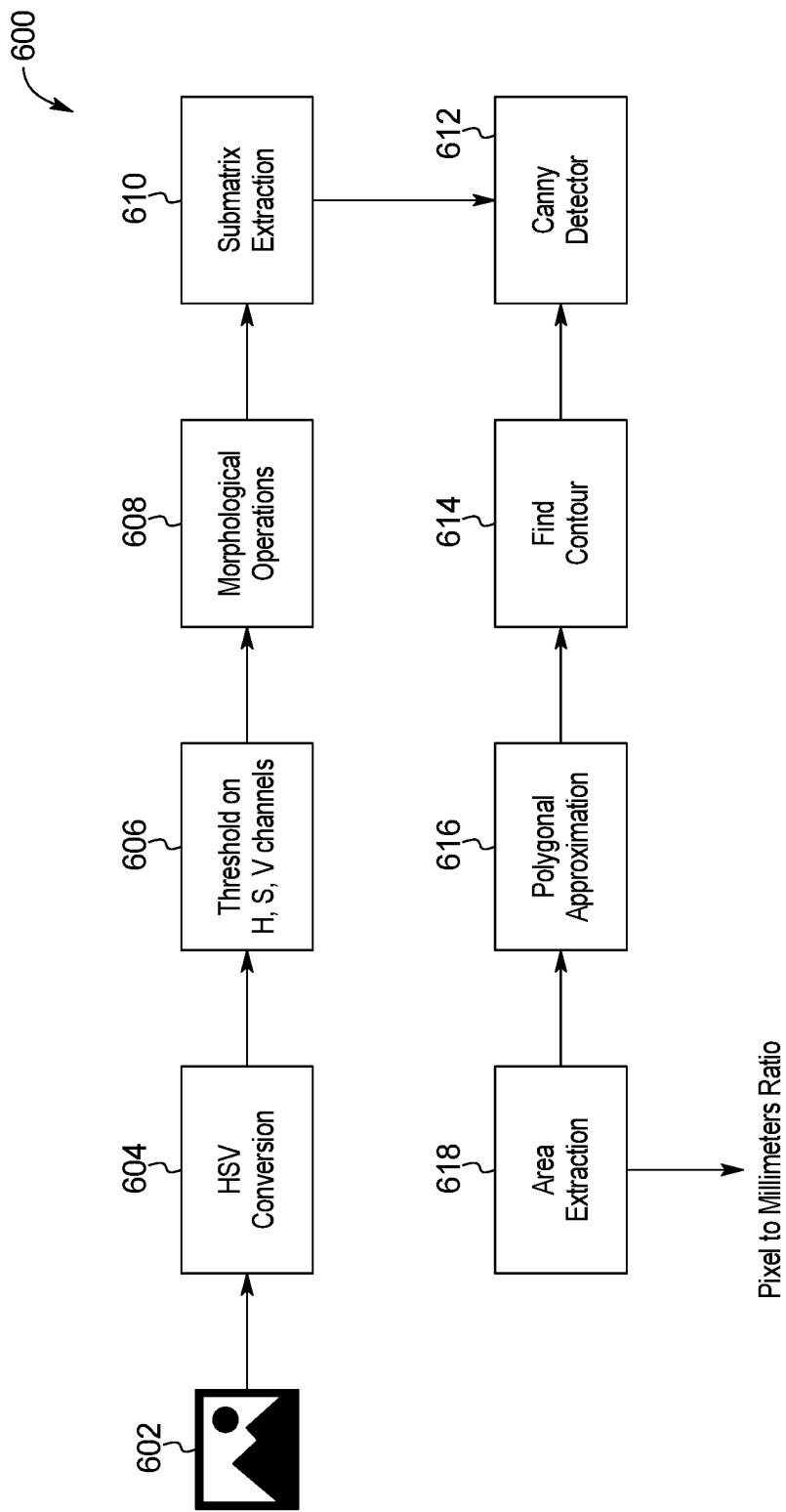
FIG. 6 is a block diagram of an example system for skin image scale extraction of the skin abnormality monitoring system of FIG. 1.

For a typical image, the process in FIG. 3B will detect multiple threshold values, as referenced in the paragraph above, that are within the lower and upper validation limits. While it is not guaranteed, it is highly probable that the optimal skin mask exists within this set of thresholds. To determine the final and preferred threshold value, the input image is subjected to each threshold and outlines such as those in FIGS. 4B and 5B are generated. These outlines are compared against a known set of likely shapes based on the poses presented to the patients and doctors from the client application in FIG. 1. Each threshold will have a percent match against all known "likely shapes." The best percent match is selected to represent each threshold. To select the best skin mask, the set of percent matches are analyzed as follows:

1 Sorted from largest to smallest
2 The delta between each percent match is calculated
3 The first local min of the set of deltas is found
4 The skin mask threshold corresponding to the selected y is selected as the final mask Step 210 of Phase I 202c may also include an example method of skin image scale extraction 600 shown in FIG. 6. An image 602 is converted to an HSV (Hue, Saturation, and Value) colormap in step 604 for efficient localization of the reference mark, such as a ⅜" diameter green adhesive dot. In step 606, the image 602 is thresholded. In one embodiment, the system uses a threshold range of 38-85 for Hue and 0-255 for Saturation and Value to locate the green reference mark in the image. The thresholded image is then smoothed using morphological operations to remove artifacts that are too small and close any gaps that might have appeared during thresholding in step 608.

The image is then cropped around the coordinates of the reference mark on the given picture to minimize the computational time for processing the image in a submatrix extraction in step 610. In step 612, a canny detector is used to extract lines and edges within the image. The contours of the skin surface are determined next in step 614. To avoid producing any residual false-positive green pixels on the image, a polygonal approximation is applied in step 616 to identify reference marks. More specifically, a polygonal approximation is used for the circular reference mark. As a circle is a polygon with an infinite number of vertices, any region that has more than six vertices can be approximated as a circle, i.e. the reference mark. If such a polygon cannot be found in the cropped image, the original image is cropped again, with a larger window until the circle is detected.

Lastly, the contour of the reference mark is extracted and its area is computed in pixels in step 618. Since the actual size of the reference mark (⅜" diameter) is known, the appropriate pixel-to-mm ratio is calculated.

After the skin mask localization of step 210 and prior to the skin image keypoint localization of step 212 (described below), the skin abnormality monitoring system 100 includes an optional intervention step 211 at which point the user may rerun the skin mask localization of step 210 if desired. Optional intervention step 211 enables the system moderator or user to confirm the output of step 210 or to modify constants used in the analysis of step 210.

Figure 7:
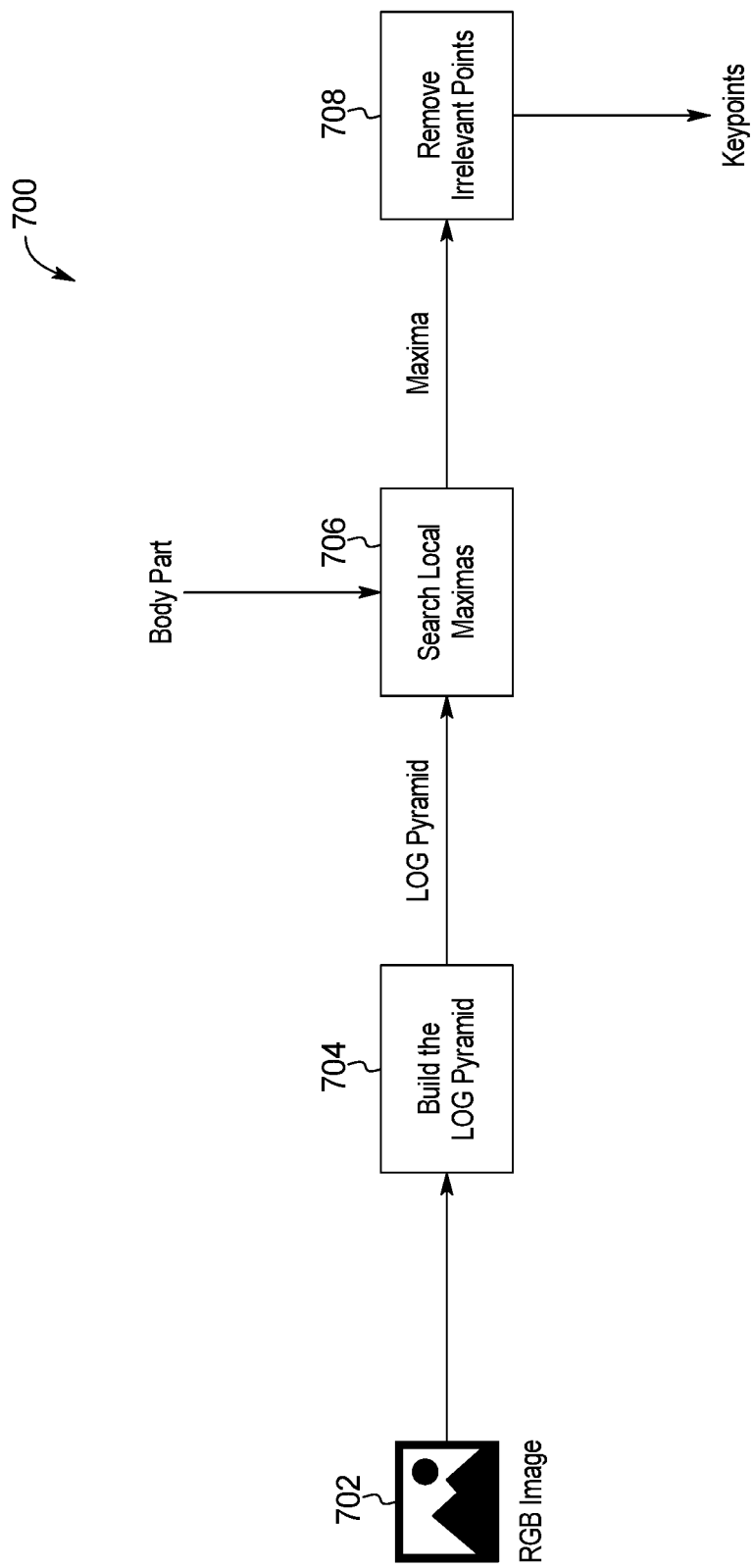
FIG. 7 is a block diagram of an example system for skin image keypoint localization of the skin abnormality monitoring system of FIG. 1.
Figure 8:
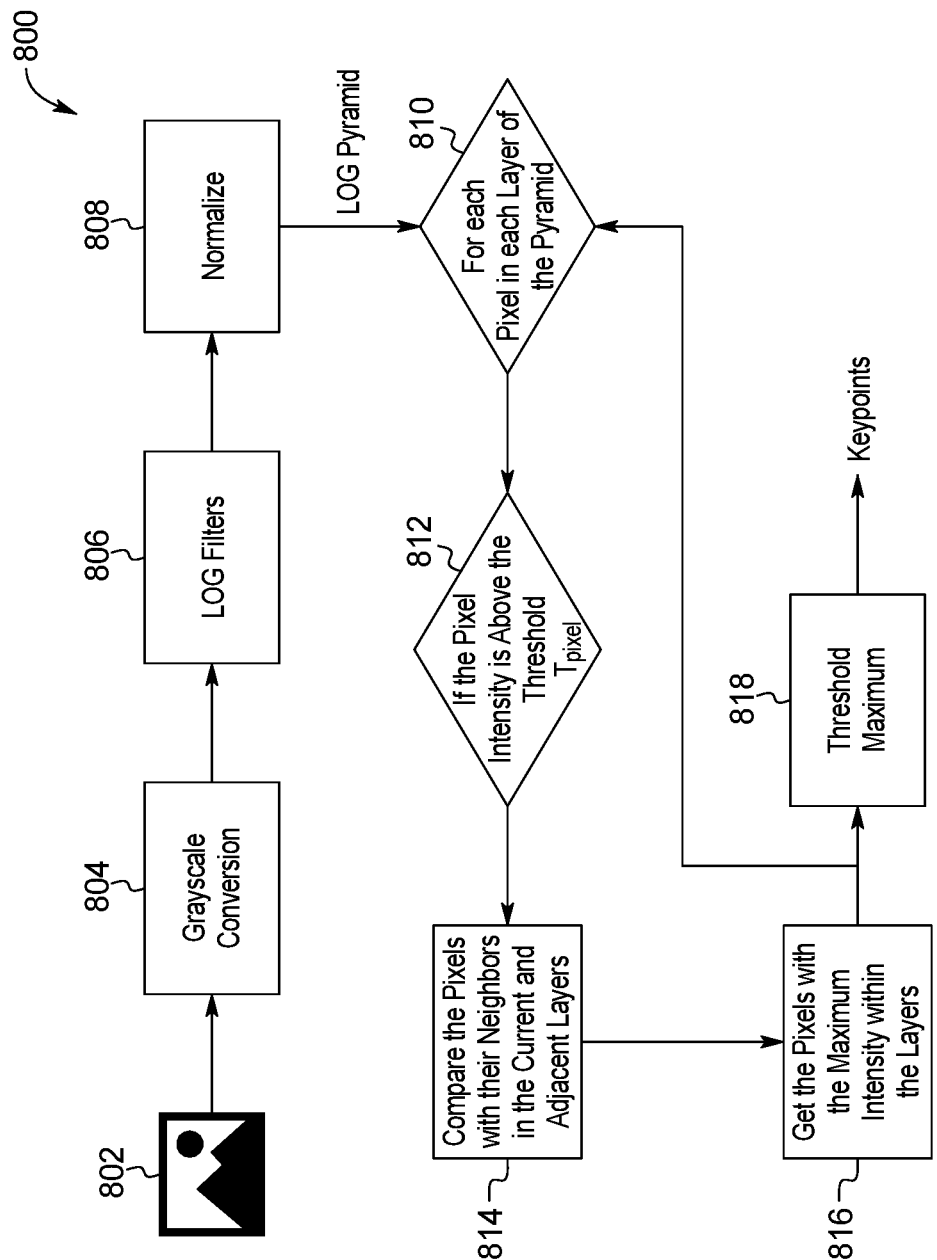
FIG. 8 is a block diagram of an example system for skin image local maximum extraction of the skin abnormality monitoring system of FIG. 1.

Referring back to FIG. 2, steps 212 and 214 of Phase I 202c include a method 700 for skin image keypoint localization shown in FIG. 7 and a method 800 for skin image filtering shown in FIG. 8. The example method 700 for skin image keypoint localization includes the detection of pigmented lesions in each photo of an image set 702, which is one of the central functionalities in the Image Processing phase. This process is composed of three distinct steps. In step 704, a Laplacian-of-Gaussian (LOG) pyramid, which is a collection of filtered images using successive LOG filters, is first created from the enhanced RGB image and skin mask 702. Points with local maximum responses are then found within this pyramid in step 706, with a sensitivity that is defined by the type of body part in the image. After removing irrelevant points (e.g. duplicates, edge detections, etc.) in step 708, these extremities will form the keypoints of the image processing output.

In FIG. 8, the example method 800 for skin image filtering uses a LOG filter to highlight the points of interest in the image. This method is called "blob detection," as it finds the regions that differ from their neighbors based on properties (contrasts, color, etc.). In this case, the blobs are the moles or anomalies on the skin.

Before any processing, the RGB image 802 is converted to a grayscale image in step 804. A series of LOG filters is then applied to build the layers of a pyramid of filtered images in step 806. The successive filters differ in their standard deviation and size: the size of these parameters corresponds to the size of the detected point of interest. The ranges of standard deviation/size depend on the body part captured on the image. In step 808, the layers of the pyramid are normalized to output intensities between 0 and 1.

Steps 810-816 of the method 800 for skin image filtering are directed to steps for skin image local maximum extraction, in which the points of interest or keypoints are located by finding the local maxima within the LOG pyramid. In steps 810 and 812, each pixel of each layer of the pyramid is selected and evaluated to determine if the pixel intensity is above a minimum threshold. The pixel is then compared to its neighbors in the current filtered image and in the layers above and below in step 814. In step 816, the pixel with the largest intensity is selected, and in step 818, the selected pixel is thresholded. The parameters that define the sensitivity of this detection are the number of neighbors considered and the value of the threshold above.

This process filters out irrelevant detections such as duplicates and edge points from the collection of detected keypoints on an image. If two points of interest are too close to each other based on a predefined threshold, they are classified as duplicates. These points are then merged and the average of their coordinates is taken. The filters can also present some strong responses along the edges. These points will present a large principal curvature along the edge but a small one in the perpendicular direction. Thus, the Hessian matrix at the location of this point has to be computed and the following formula gives us a criteria of selection:

$Tr(H)^2/Det(H) < R$ with $R$ the ratio of selection

Figure 9:
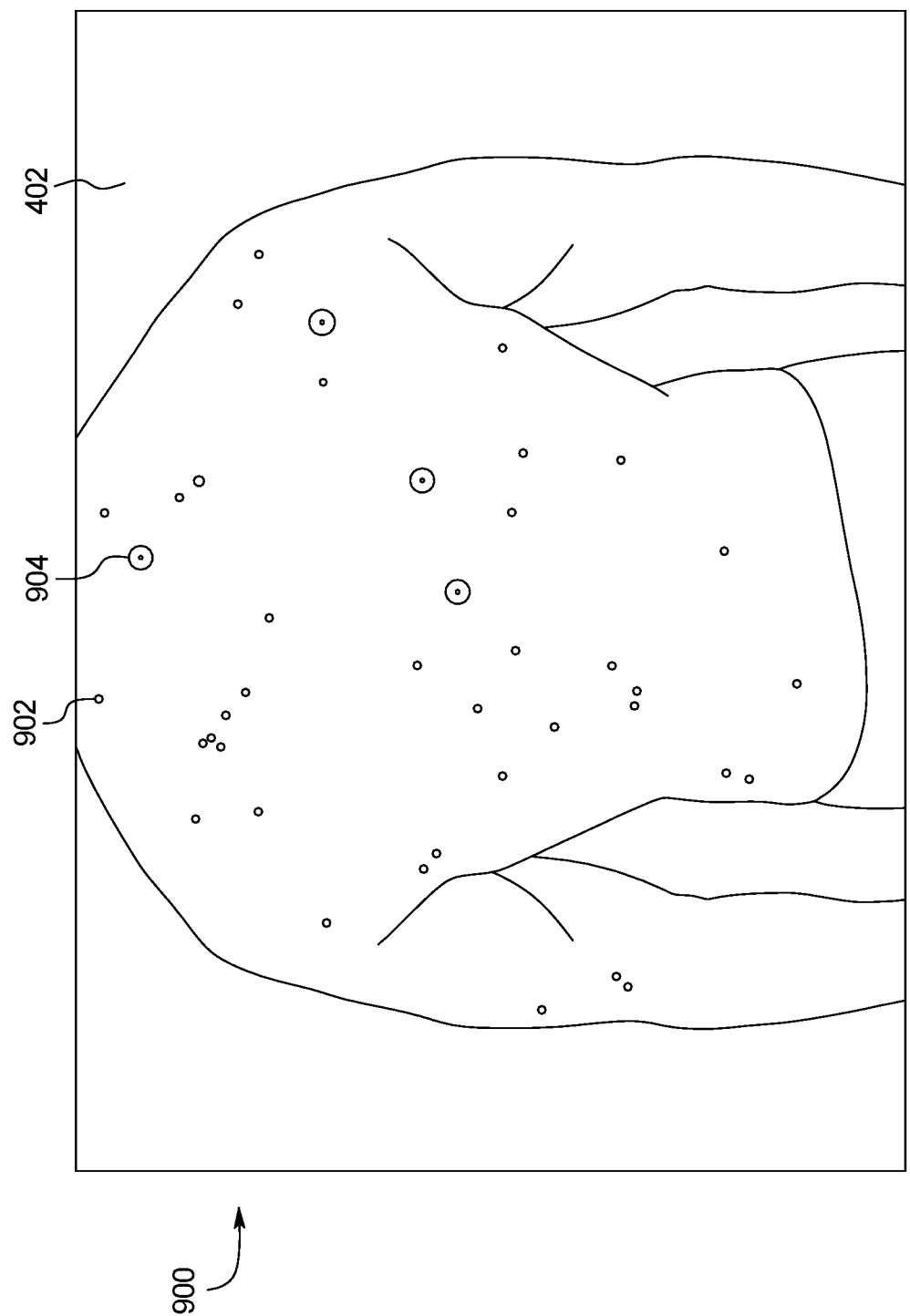
FIG. 9 shows an example output image of the systems of FIGS. 3, 6, 7, and 8 of the skin abnormality monitoring system of FIG. 1.

Referring to FIG. 9, the results of Phase I 202c, including the example methods shown in FIGS. 7 and 8 for mole/anomaly localization, can be seen in the form of an image 900. A number of skin anomalies 902 are indicated by a small circle, with keypoints data 904 identified by a larger circle 904.

Referring back to FIG. 2, the image data is processed separately by machine learning systems called upon by the processors to classify keypoints and identify body landmarks in Phase II 202d. Phase II 202d includes the steps of classifying keypoints and determining body landmarks in steps 216 and 218, respectively, performed in parallel. Of the resulting classification and body landmark data, the keypoints data and the body landmarks are transmitted to the processor 104 to be processed by the merging algorithm that merges the detections of the image data. The remainder of the data is sent to the API server 108 and in turn passed onto the database 116.

Figure 10:
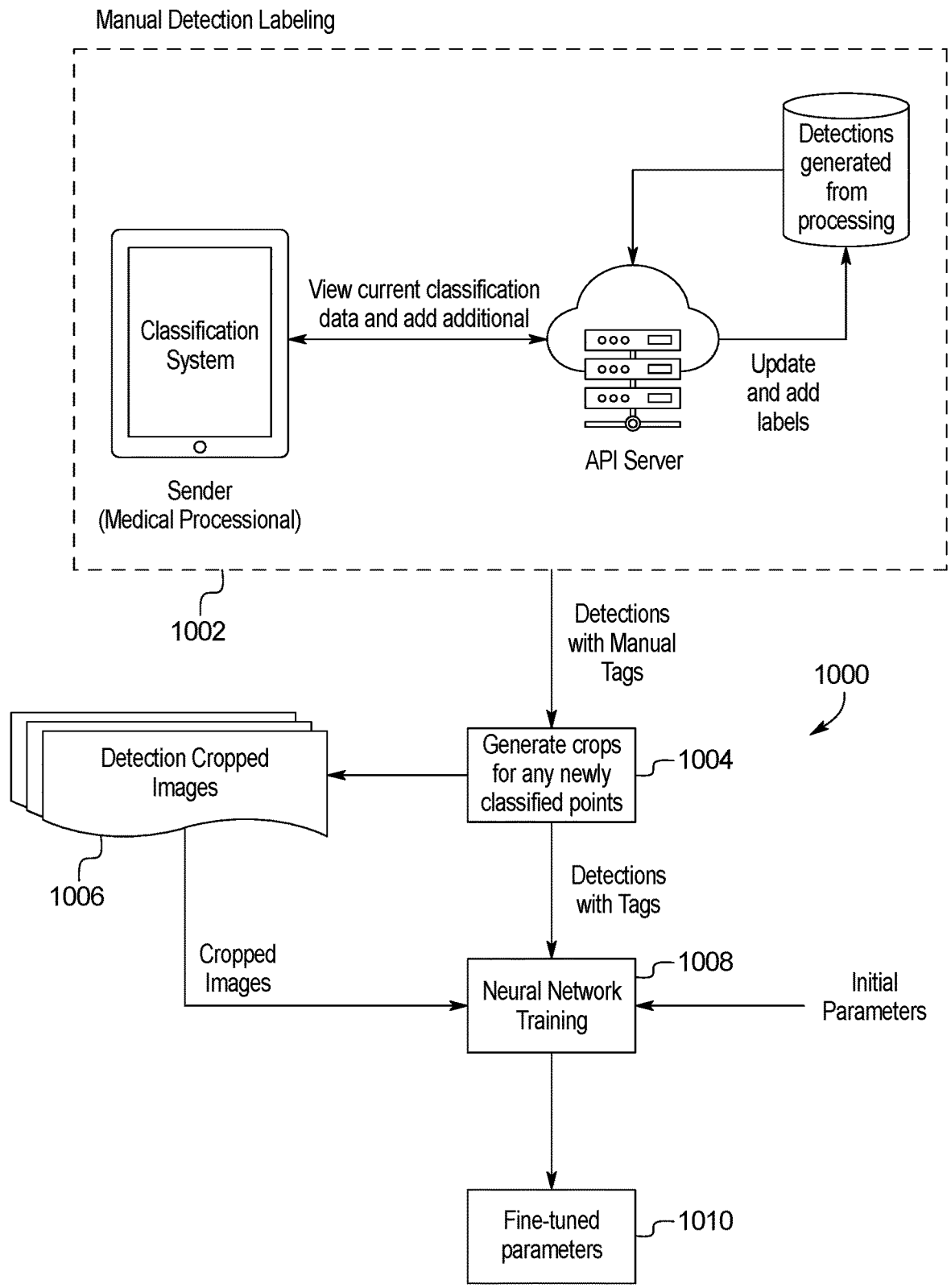
FIG. 10 is a block diagram of an example system for skin image model training of the skin abnormality monitoring system of FIG. 1.
Figure 11:
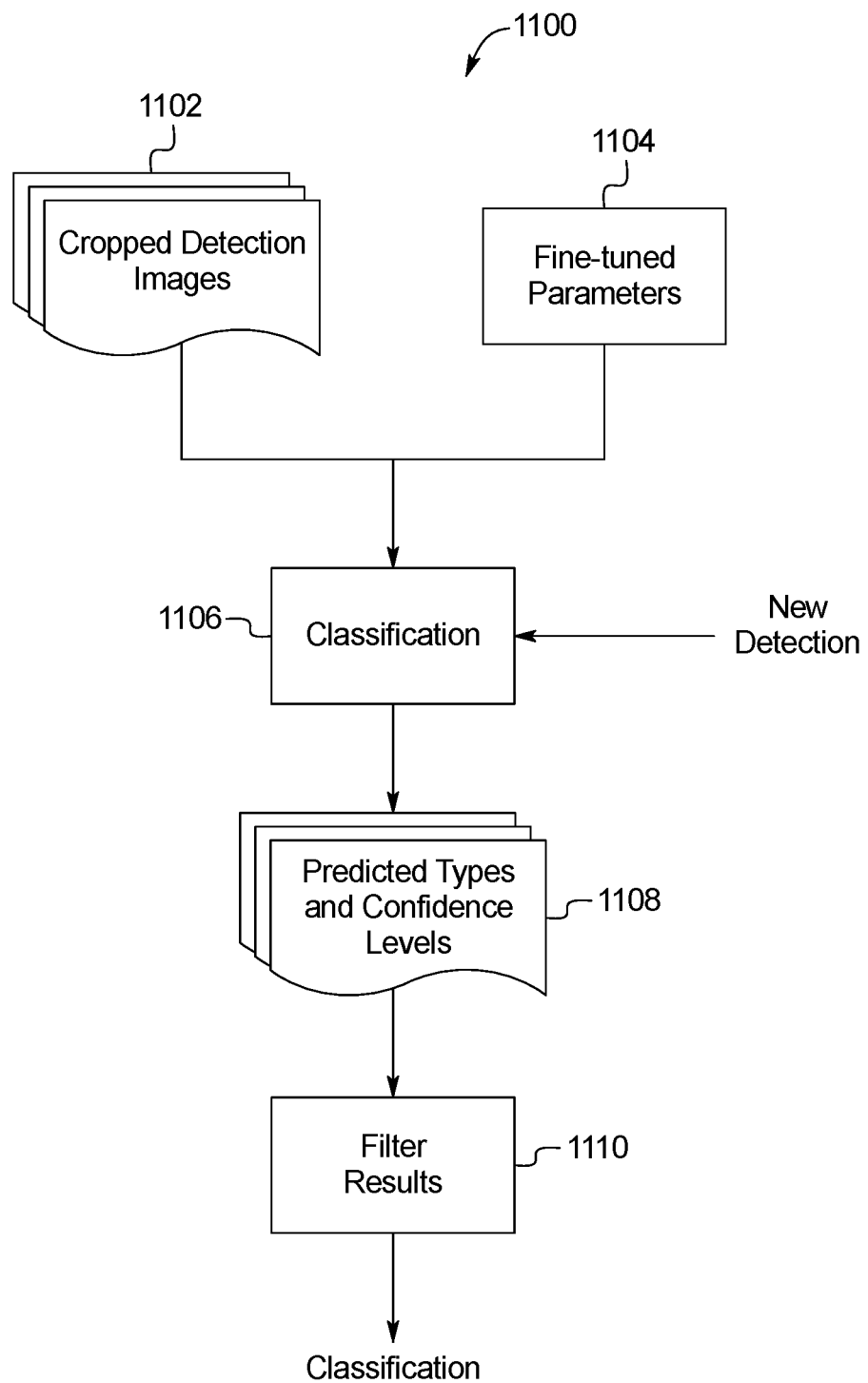
FIG. 11 is a block diagram of an example system for skin image keypoint classification of the skin abnormality monitoring system of FIG. 1.
Figure 12:
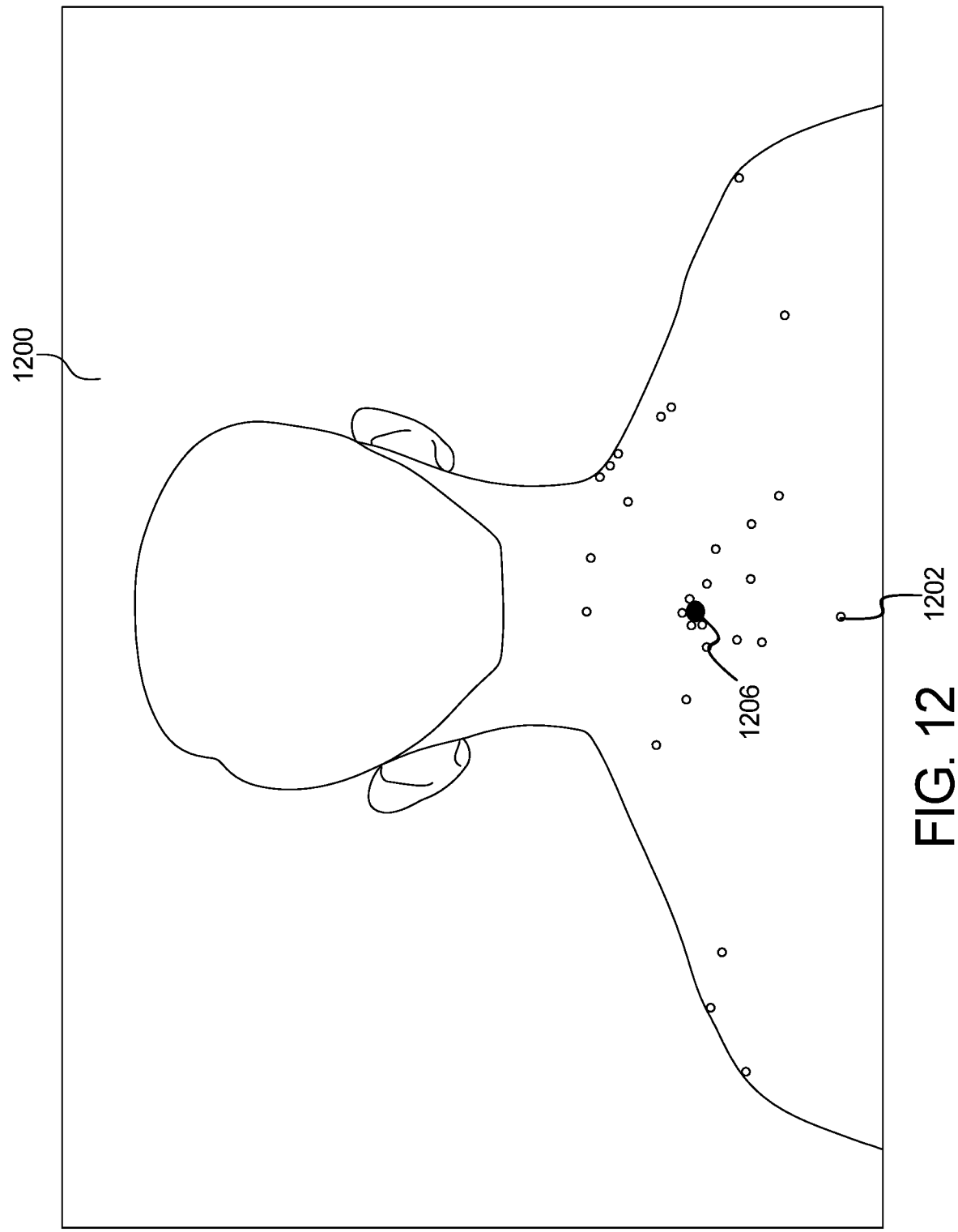
FIG. 12 shows an example output image of the systems of FIGS. 10 and 11 of the skin abnormality monitoring system of FIG. 1.

Following skin mask localization, the keypoints, or points of interest, are generated using a pyramid of LOG filters. Duplicates are removed, and the data is sent to the classification step 216. A variety of machine learning models are then applied to classify and filter the keypoint data to identify detections against data that is simply noise. Simultaneously, the image data is processed to identify landmarks on body regions to facilitate matching of keypoints between original and follow-up images in step 218. FIGS. 10-12 illustrate the methods related to Phase II 202d of the method 200 of processing and analyzing skin maps of a patient.

Referring to FIG. 10, an example system and method 1000 of skin image model training is shown using known machine learning techniques. Deep learning frameworks with convolutional neural networks are utilized to classify keypoints from previous steps into different types for purposes of removing false-positives and classifying skin lesions. A convolutional neural network model specifically trained for the task of keypoint classification is generated using 30,000 manually labeled spots through ARTSy (an internal photo review and annotation system) and calculated with the GPU mode of an open source deep learning framework, such as Caffe, TensorFlow, or any other suitable machine learning software.

During a manual detection labelling step 1002, a medical professional may view the image data stored on the API server and manually update or add labels for any of the detection data. In step 1004, the detection data with manual tags is cropped for any newly classified points to generate detection cropped images 1006. In step 1008, the cropped images 1006 are then provided to the neural network training, which is pre-programmed with initial parameters.

The machine learning module in the keypoint classification of step 216 of Phase II 202d is designed and tailored to specifically distinguish keypoints into relevant types that can increase accuracy of mole localization and potentially skin lesion classification. While the neural network model is utilized in the example embodiment, other model types may be used as well.

The classification model used in the present method relies on transfer learning using a base model from computer science literature that consists of five convolutional layers trained with 1.2 million manually labeled images for general object classification (AlexNet). Taking the architecture of this model and the parameters as starting weights, the model parameters are fine-tuned and optimized so that they can be used for the specific skin keypoint classification task. Sections below describe the two parts in the machine learning module: training and prediction.

A working neural network model is first trained with ground truth that match a large number of input instances with a class or label. This process is done through ARTSy, which identifies and records the keypoint type associated with a local cropped image around the keypoint.

This information is then passed on to the machine learning training module, which optimizes and fine-tunes the parameters that link input data (pixels in local cropped images) with output label (keypoint type) through a back-tracking process called back-propagation that updates parameters based on partial derivatives of activation functions with respect to the nodes in step 1010. The result of this process is the updated parameters associated with the original neural network architecture that has been optimized for the skin lesion classification task.

Accuracy, precision, and recall are then calculated on a validation or test set, which contains crops that the classifier was not exposed to during training, and are used as measures of the quality of the fine-tuned model. With a binary classification model (one vs. all keypoints), an accuracy of at least about 80%, preferably between about 84% and about 88%, can be obtained. Other models include a seven- or eight-level classification (mole, skin, edge, background, fabrics, freckle, and hair). These models provide a starting point for the machine learning model to be integrated with the image process workflow of FIG. 2. Additional model training processes are underway for diagnostic skin lesion classification.

FIG. 11 shows an example method 1100 of skin image keypoint classification. Using the fine-tuned model, a new candidate keypoint with no prior knowledge of type association can be processed and assigned with a predicted classification label along with a confidence level. Given the coordinates of a new keypoint, the neighbor pixels around the keypoint are cropped in step 1102 and processed as the input data to the fine-tuned neural network. In addition to the cropped detection images 1102, the fine-tuned parameters 1104 are provided as input to the initial classification of step 1106. The respective probabilities of the keypoint belonging to each known class are computed as the output from the network in step 1108. The machine learning module then takes the class with the highest probability as the mostly likely class and the prediction result, with the value of probability as the confidence level. Detections classified as keypoints in the binary model or in the "mole" class in the seven- or eight-class model are then passed to the API server 108 for image processing in step 1110. The remainder of the classification results are labelled as false positives and sent to the database 116 for validation purposes only. In the case that a non-binary classification is used, the classes include categories such as mole, skin, edge, background, hair, fabrics and freckles.

Example results of the methods of FIGS. 10 and 11 can be seen in the form of an image 1200 of FIG. 12. In additional to keypoint classification, machine learning has also been adopted to identify landmarks on body regions to facilitate matching of keypoints between original and follow-up images. The goal of this process is to identify distinctive landmarks on body regions, so that they can serve as anchors across images taken at different times. This identification of body landmarks is only relevant for matching between temporally distinct photo sets, as the landmarks would provide sufficient information to extrapolate an anchor. Referring to FIG. 12, the image 1200 includes a plurality of keypoints data 1202 identified by a circle. The green dot 1206 is also illustrated.

Similar to the keypoint classification network, manually labeled landmarks on body regions are first recorded as training data to fine-tune the same general object classification neural network model from literature. An example task is to identify shoulders in head or torso regions. Instead of keypoints from mole localization, the training input comes from cropped images taken along the skin mask contour, so that the coordinates at the shoulder curvature can be visually identified and recorded. Given the trained model, classification is made by taking many candidate coordinates and cropped images along the skin mask contour, and performing binary classification on whether the cropped region belongs to the shoulder. This process is repeated for any region in the set.

The first step of the keypoints merging is to isolate the keypoints that intersect with each other and separate them from the rest (singleton detections) so that they can be analyzed two by two to assess if they need to be merged together. Determining if two detections need to be merged into one is the result of a very simple process. For each set of two intersecting detections, three cropped images are extracted: the first two containing cropped images centered on the first and second detection of that analyzed set, while the third one contains a cropped image encompassing both detections. A contour analysis is then performed on each trio of cropped images to determine whether the overlapping detections should be merged: if the third cropped image contains only one contour based on the contour analysis, the overlapping detections are merged into a new detection with a newly computed center and radius. Once all of the overlapping detections have been assessed for merging, the updated set of detections are added back with the singletons and the properties of the whole set of detections are then computed.

Figure 13:
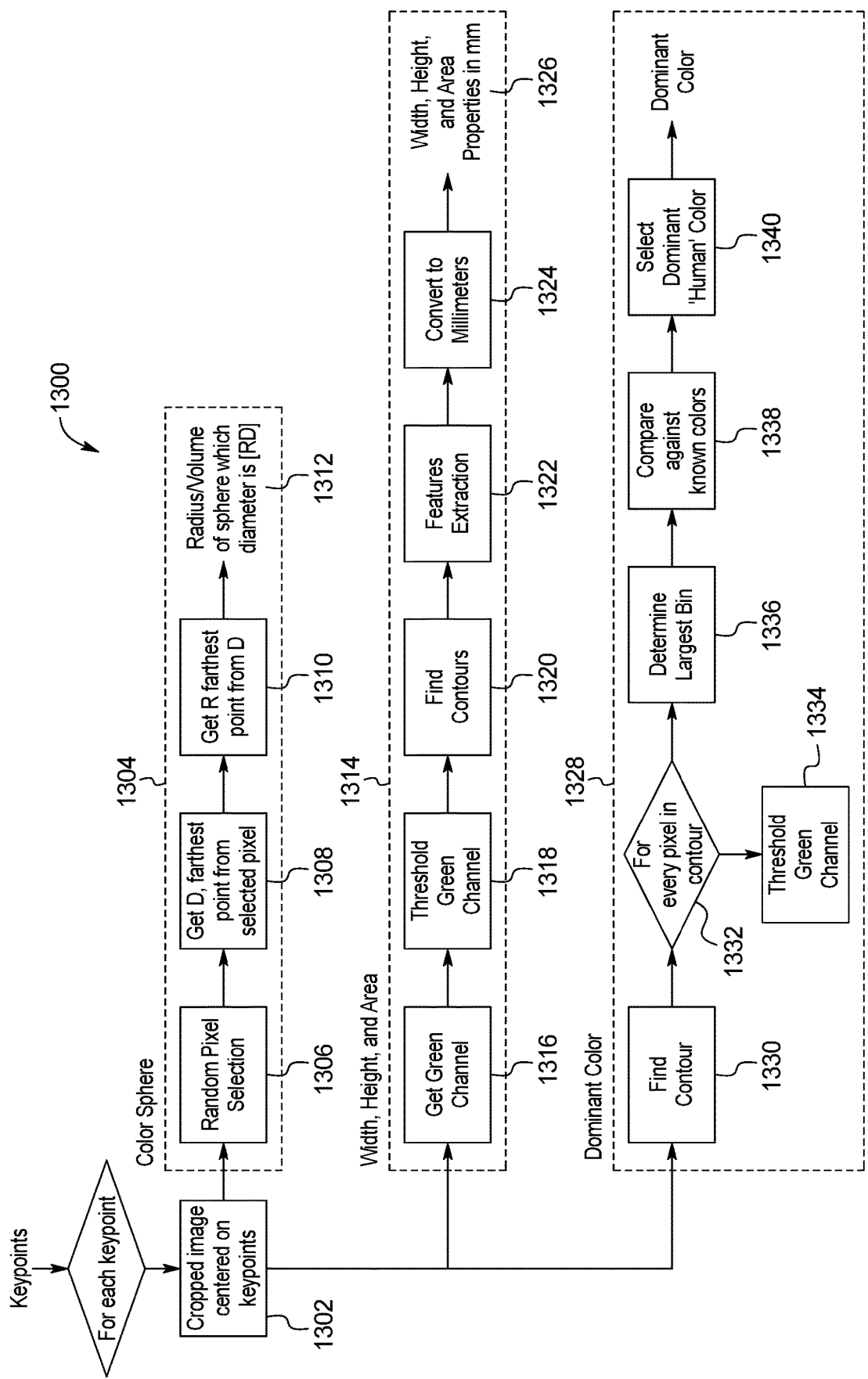
FIG. 13 is a block diagram of an example system for skin image properties extraction of the skin abnormality monitoring system of FIG. 1.

Once all the detections have been assessed for merging, they are put back with the singletons and the properties of the whole set are then processed for skin image properties extraction through the example system and method 1300 shown in FIG. 13. Once keypoints are located and classified, geometrical properties such as the height, width, perimeter and area are computed. However, some specific lesions might be too big to be detected as only one detection. Therefore, those detections need to be treated first, as this would affect the properties.

Each point of interest is extracted in step 1302 and then processed to define the color sphere, the width, height, and area properties, and the dominant color, as described below.

To define the color sphere, an example method 1304 for skin image spherical approximation of color is shown in FIG. 13. All the pixels are then placed in a 3D space (the three axes representing the three channels R-G-B). The goal is to approximate a sphere that encloses the color distribution plotted on the RGB space, for which the diameter is the distance between the two farthest points in the panel.

Figure 14:
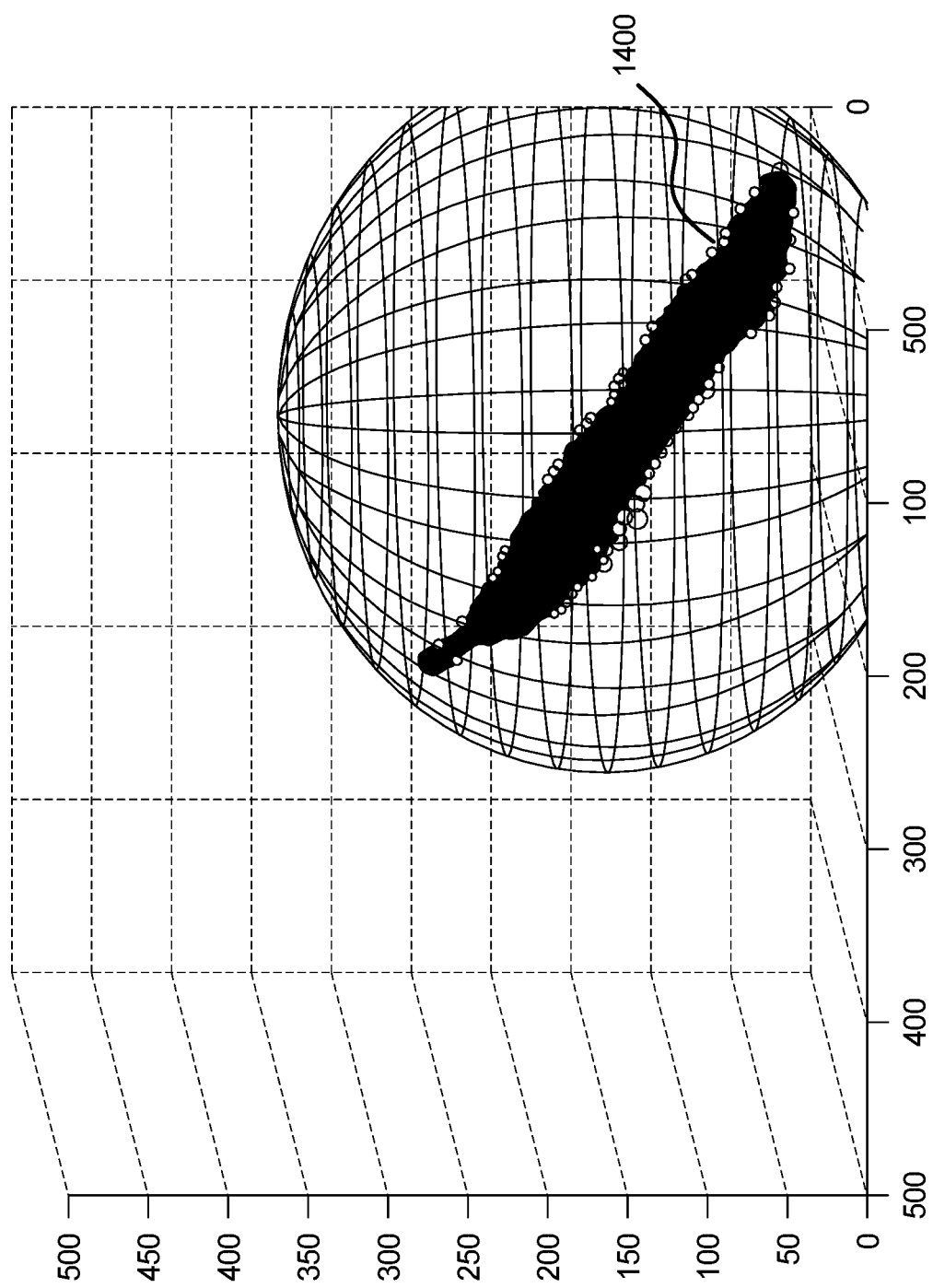
FIG. 14 shows an example output graph of the color sphere component of the system of FIG. 13 of the skin abnormality monitoring system of FIG. 1.

To do so, a random pixel in the panel is selected in step 1306. In step 1308, the 3D Euclidian distance from that pixel to all others pixels is computed. The greatest distance is the first point of the sphere, Point D. In step 1310, all 3D distances from D to all other pixels are computed. The greatest distance is Point R. The diameter of the sphere is the distance [RD], from which the volume and radius of the sphere is calculated in step 1312. These values provide metrics that define the evolution of color distribution over time. An increase in the spherical volume or radius would then indicate a change in the color distribution of a given keypoint. FIG. 14 illustrates an example result of the spherical approximation method performed in FIG. 13 is shown in the form of a three-dimensional graph 1400.

To extract the contour of each point of interest, an example method 1314 for determining sphere dimensions is shown in FIG. 13. The green channel is obtained in step 1316 and thresholded to remove the background (skin) in step 1318. The contour of the moles/anomalies is determined using, for example, the built-in OpenCV function, findcontour, in step 1320. OpenCV provides the properties of this contour such as the perimeter and the area. Finally, the height and width are determined by enclosing the contour in an ellipse, of which the major and minor axes correspond to the height and width, respectively, in step 1322. The output of this process yields parameter values in pixels, which are then converted to millimeters using the previously calculated pixel-to-mm ratio in step 1326. The results include the width, height, and area properties in mm.

As the diameter of a sphere can be consistent for two different deltas, color sphere is supplemented by color approximation per the method 1328 of determining a dominant color in FIG. 13. The pixels within the crop used to generate size are filtered and compared against a set of colors. These colors each have a corresponding "human" color. There are various shades of browns, reds, greens, etc. The pixel colors in the crop will have a color that they are closest to from the set of colors. The collection of all human colors found in the crop can be analyzed to identify a dominant color, which anchors the color sphere values and supplements the ability to detect change. A mole can change in the color sphere space and still be "brown" or can stay relatively constant in the color sphere space and change from brown to green. Both of these changes are of importance to the patient and represent a noticeable change worth investigating further.

In the first step 1330 of the method 1328 of determining a dominant color, the contour for the point of interest is obtained. Step 1332 identifies each pixel in the contour, and in step 1334, each pixel color is added to appropriate the histogram bin. In step 1336, the system determines which histogram bin includes the largest number of pixels. The histogram bin with the largest number of pixels is compared against the set of known colors in step 1338, and a human dominant color is selected in step 1340.

Figure 15:
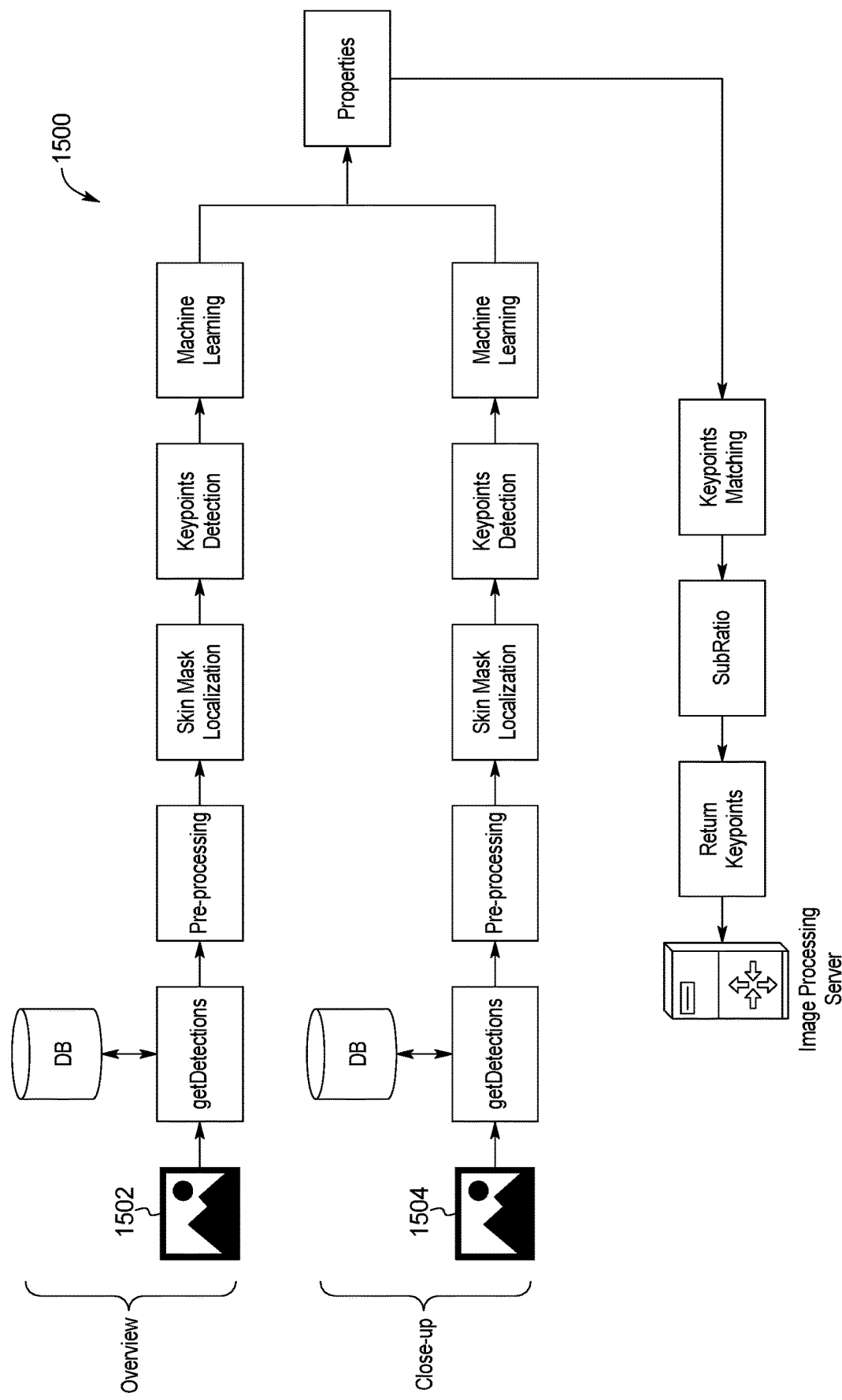
FIG. 15 is a block diagram of an example system for skin image multi-scale processing of the skin abnormality monitoring system of FIG. 1.

Referring to FIG. 15, a system and method 1500 for skin image multi-scale processing is shown. In an effort to provide as much data as possible while optimizing processing time and usability on the part of the user, the skin abnormality monitoring system 100 processes both the full-region image 1502 with the higher-resolution closeup images 1504. Each closeup image 1504 is processed separately and sets of keypoints are generated and classified through machine learning. These sets are then realigned and displayed on the distant image in the application. This method provides more accurate detections, improving the precision in the properties, removing a larger amount of false-positives, and facilitating comparisons of images with subsequent sets.

Referring back to FIG. 2, the image data is next processed through a merging algorithm that merges the skin maps of the image data in Phase III 202e. The classified keypoints are then merged in step 220 to make sure that there is a 1:1 mapping between physical points of interest on the patient, and the data in our set. Without merging, it is possible that two digital detections could exist on a single physical point.

Figure 16:
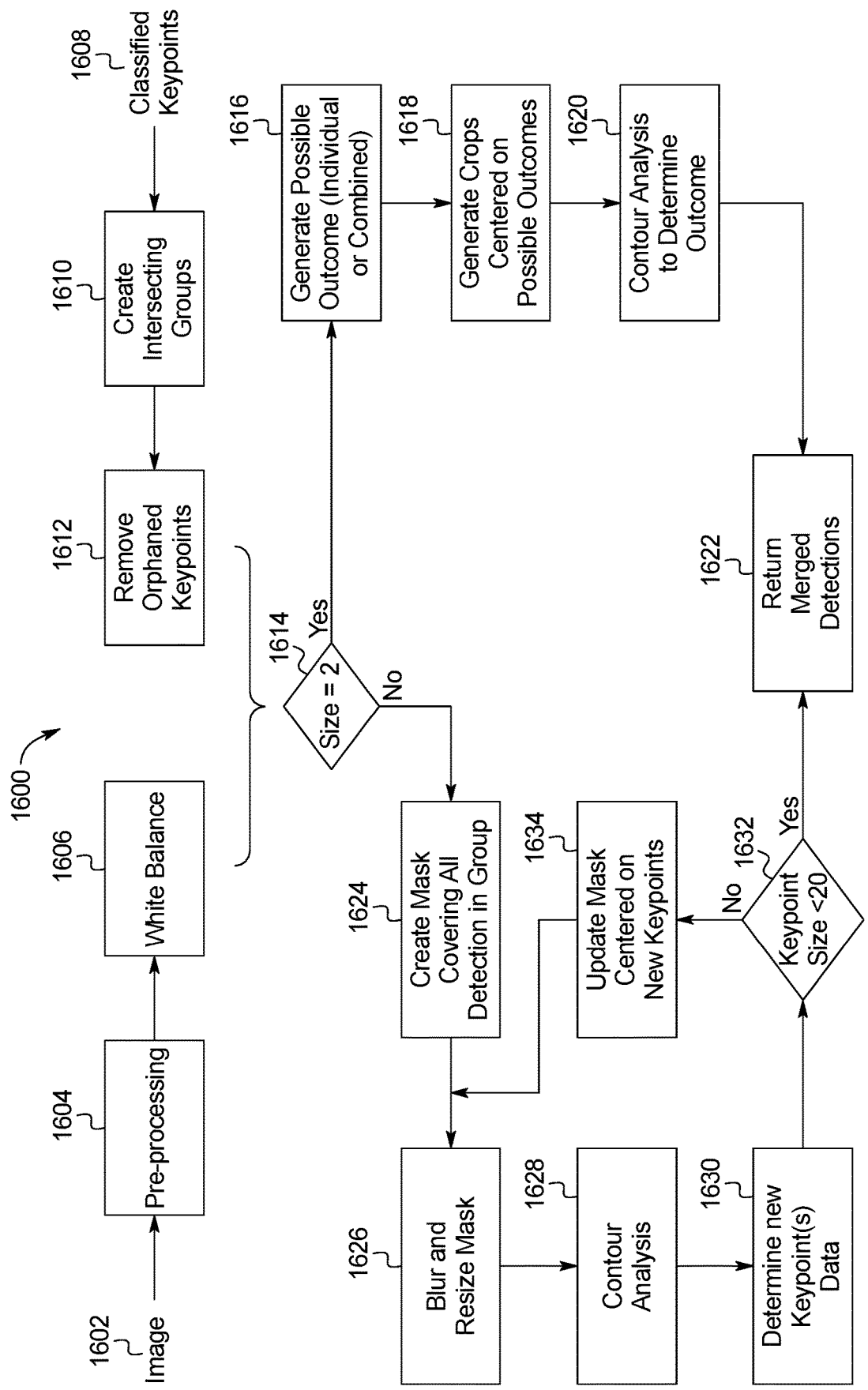
FIG. 16 is a block diagram of an example system for merging detection data of the skin abnormality monitoring system of FIG. 1.

Referring to FIG. 16, a method 1600 for merging skin maps and/or keypoint data of the image data is shown. Each image 1602 undergoes pre-processing in step 1604, with the color being adjusted and balanced in step 1606. Separately, classified keypoints 1608 collected from each image are categorized into intersecting groups in step 1610, from which the orphaned keypoints are removed in step 1612. Each detection has a position defined by the center of the detection and a radius defined by the size of the detection. Intersecting groups are defined as at least two detections that overlap. In step 1614, the number of detections to be merged is determined. If the number is equal to or greater than 2, possible outcomes of merged data are generated in step 1616. In step 1618, crops centered on possible outcomes are generated, and a contour analysis on each crop is performed in step 1620 in order to determine the outcome. The merged detections are provided in step 1622.

If the number of images to be merged is less than 2, then a single mask is created covering all of the detections in the group in step 1624. In step 1626, the mask is blurred and resized. A contour analysis is run in step 1628. In step 1630, the mask is evaluated to determine new keypoint data. In step 1632, the keypoint size is determined. If the keypoint size is less than 20 pixels, then a new skin mask is centered on the new keypoint data in step 1634 and the process returns the new skin mask to step 1626 for blurring and resizing. When the keypoint size is less than 20 pixels, the portion of the skin mask including the merged detections are provided in step 1622.

Figure 17:
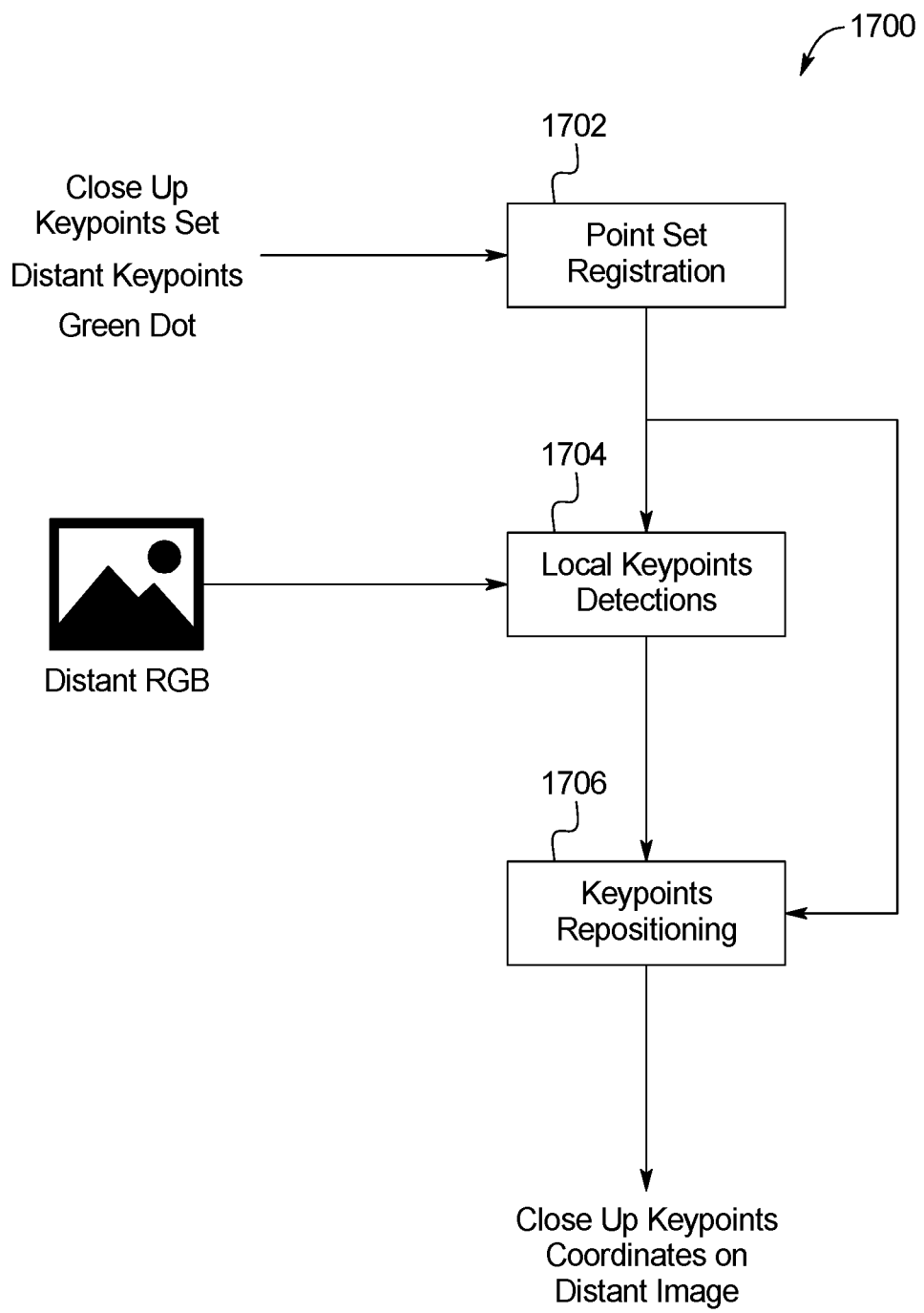
FIG. 17 is a block diagram of an example system for skin image point-set registration of the skin abnormality monitoring system of FIG. 1.

FIG. 17 illustrates an example method 1700 for skin image point-set registration. Using the green dot coordinates as a reference, the keypoints detected in the closeup images and full-region image are approximately aligned using point set registration in step 1702. To correct the potential misalignments, the mole detection algorithm is locally applied on the full-region image in the neighborhood of the misaligned closeup keypoint in step 1704. If a point is detected in this neighborhood, the two points are matched in coherence with their filter response in step 1706. Otherwise the closeup keypoint is considered a new detection and its coordinates remain unchanged. For situations in which the keypoint set is small (such as a patient with a small number of pigmented skin lesions), auxiliary keypoints can be generated from other body landmarks and added to the set. The contours from the patient's skin mask in each image is used to generate landmark keypoints which can be matched between image sets, thereby increasing the accuracy of keypoint matching. These landmark keypoints are removed from the set of keypoints representing significant pigmented lesions before being saved to the patient's database record.

Figure 18A:
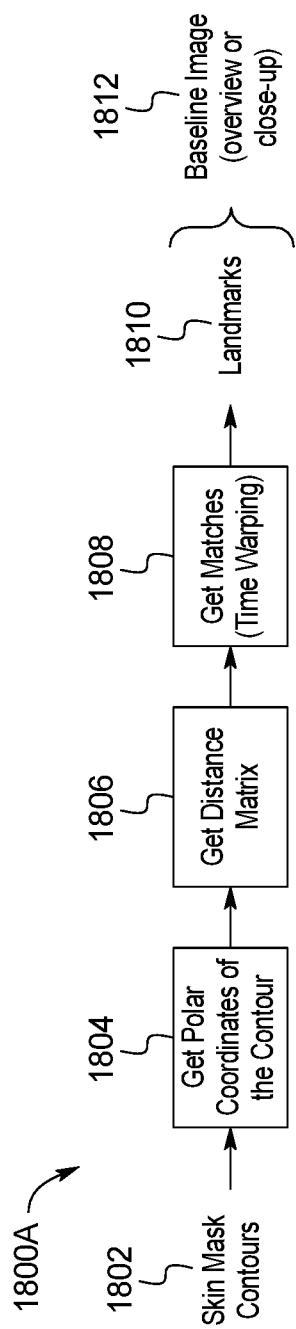
FIG. 18A is a block diagram of an example system for baseline skin image contour landmark matching of the skin abnormality monitoring system of FIG. 1.
Figure 18B:
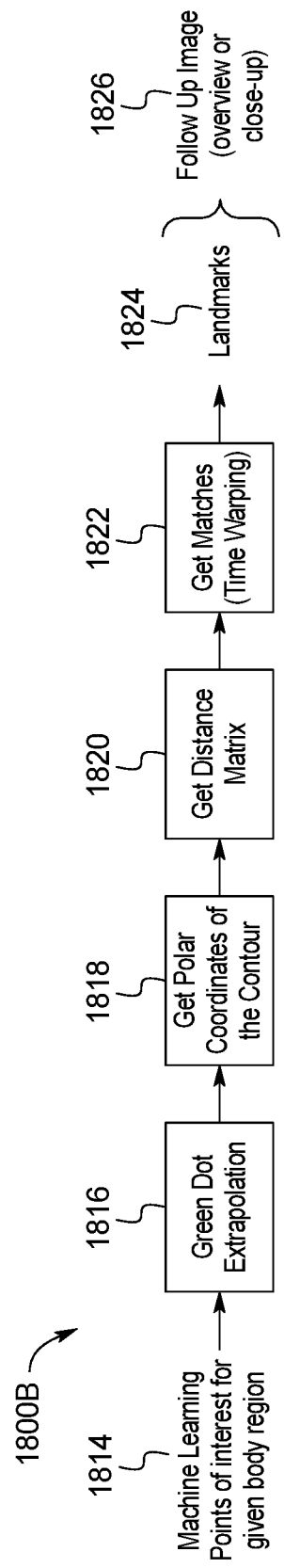
FIG. 18B is a block diagram of an example system for follow-up skin image contour landmark matching of the skin abnormality monitoring system of FIG. 1.

In FIGS. 18A and 18B, landmark keypoints are to be generated by a proprietary polar coordinate based 3-dimensional curve matching algorithm. In the method 1800A, the skin mask contours are obtained in step 1802 and the polar coordinates are determined in step 1804. The distance matrix is provided in step 1806, and the matches are obtained in step 1808. The landmarks are identified in step 1810 to generate a baseline image 1812.

Figure 19:
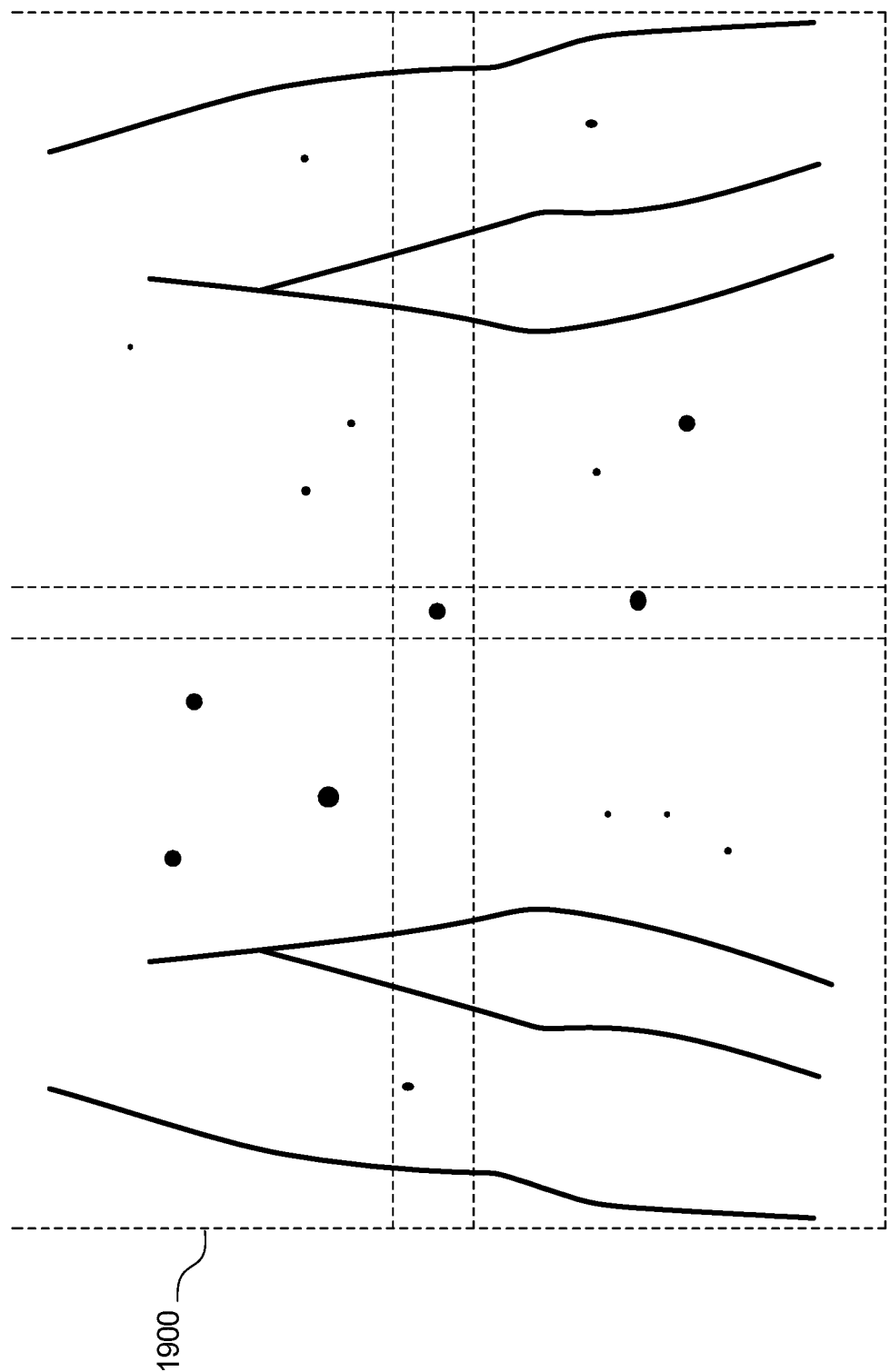
FIG. 19 shows example quadrant mapping of the skin abnormality monitoring system of FIG. 1.

For the method 1800B, the machine learning points of interest are obtained in step 1814 and the green dot extrapolation is performed in step 1816. The polar coordinates are determined in step 1818, and the distance matrix is provided in step 1820. The matches are obtained in step 1822, and the landmarks are identified in step 1824 to generate a follow-up image 1826. FIG. 19 shows the resulting image 1900 of the skin image point-set registration in FIGS. 17, 18A, and 18B.

Referring again to FIG. 2, optional intervention step 222 allows the system administrator to rerun each of steps 216, 218, 220 of classifying keypoints, determining body landmarks, and merging keypoint data. The constants and other specifics of the algorithms may be modified manually. The updated data is transmitted to the API server 108, which is then passed onto the database 116. The optional intervention allows for the verification and curation of data, as needed. This is also an important opportunity to add data to training sets that would otherwise be filtered out through the rest of the process.

During Phase IV 202f of the skin abnormality monitoring system 100, the image data is processed using a matching algorithm. If image data related to a previously captured image of the same region is available, the matching algorithm matches the previously detected and classified moles/anomalies and body landmarks of the previous image data with the current image data in step 224. The matching data is then sent back to the API server and written to the database. If no previous photo data exists, this step is skipped. Additional classification data can be stored for future iterations of the machine learning training sets, the skin mask results and detection results can be verified, and landmarks can be manually added. The matching algorithm may filter the data as well. Should any of the previous steps need to be repeated, the process can be started over with manually configured configuration values. After the conclusion of the intervention or in the case that data is allowed to flow freely, matching occurs next. Matching may use the skin masks, detections, and/or landmarks generated in the classification of keypoints or manually added to match one set of data to a previous set for the same region for a given patient. After matching completes, there is a mapping for each point in the current set to a point in the previous set, or a determination that a given point has no pair in the original set.

Figure 27:
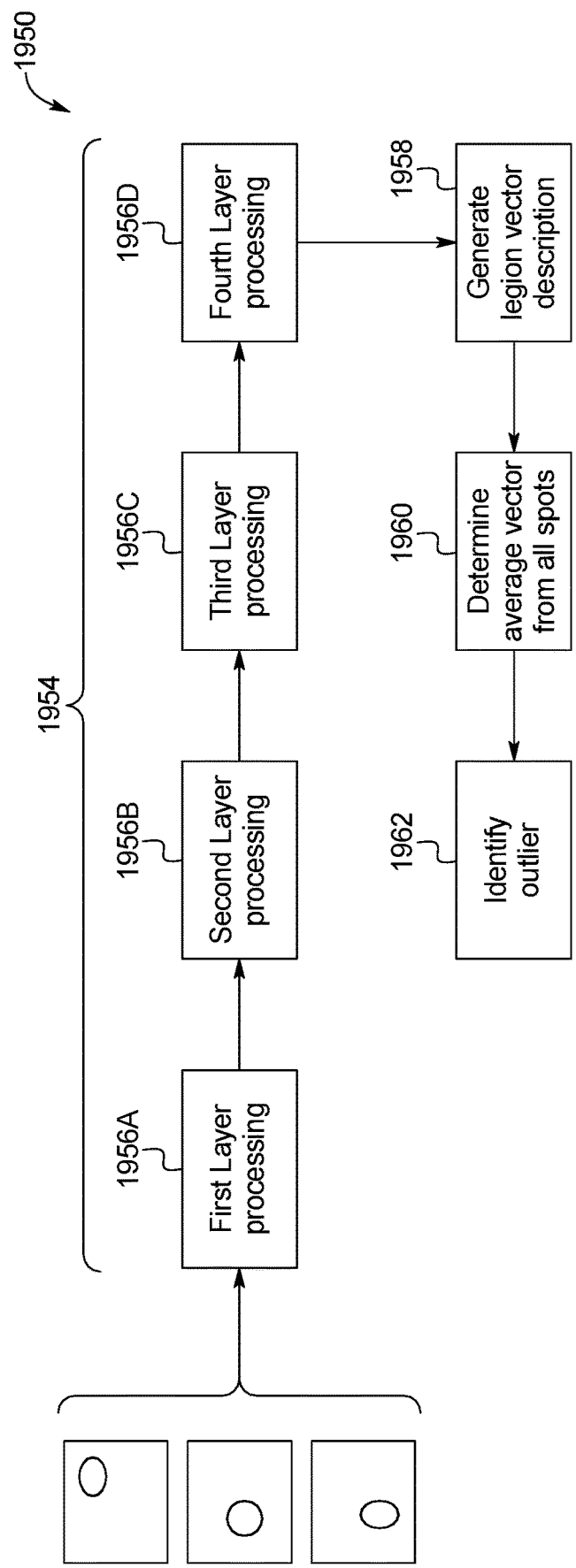
FIG. 27 is a block diagram of an example outlier detection method of the skin abnormality monitoring system of FIG. 1.

In some embodiments, the skin abnormality monitoring system 100 utilizes neural network modeling when identifying lesions that stand out from others on the skin. Outlier lesions refer to potentially suspicious moles that require or warrant further evaluation. An exemplary outlier detection method 1950 is detailed in FIG. 27.

In one embodiment, the system 100 analyzes all moles or lesions detected in an image to identify outlier lesions. In a first step 1952, the system 100 crops an image around each lesion as input to the neural network 1954. In steps 1956A-1956N, each image undergoes process through a plurality of layers 1956 in order to generate a vector description or representation for each lesion in step 1958. In one embodiment, each vector representation or description consists of 1024 numerical values that visually describe each lesion, and which are largely invariant to changes in image transformations such as image scale and rotation. In other embodiments, the vector representation may include more or less than 1024 numerical values. The system 100 then determines the average vector from all spots or lesions detected in the image session in step 1960 and calculates a normalized distance metric between all spots and the average in order to identify outliers in step 1962. The system 100 identifies any outlier moles or lesions based on the normalized distance metric.

In some embodiments, outlier detection processing per method 1950 is performed automatically once all images of a session have completed mole mapping. Results from the outlier detection processing 1950 are available to the medical provider within 10 to 20 seconds after the photo session is complete, allowing the outlier detection results to guide additional enlarged or dermoscopic image photo taking as well as reviewing images or results with a patient during their visit.

A key feature of the invention is to detect changes in skin over time, including any new growths or changes to existing moles or skin anomalies, by comparing the detections on two images of a same or similar body region. Once the moles have been detected in both the original image set and follow-up image sets, the algorithm aims to match the two detection sets. Thus, the new keypoints can be detected and the properties of the pre-existing ones can be compared.

As seen in FIG. 19, example quadrant mapping used in multi-scale image processing is shown. This algorithm is based on the registration of point sets for non-rigid transformation, a well-known technology in the computer vision field. The quadrant mapping accurately models the transformation required to align two sets of points and assign the correspondences between the two images. This method is robust to deformation (rotation, translation, compression, scaling, etc.) and degradation (noise and missing points). This mapping prevents incorrect results in the case where the patient has moved or rotated in one image as compared to another, thus leading to a high rate of false-positives or results where some moles may not be detected.

In one embodiment, the algorithm is based on the Thin-Plate Spline (TPS)—Robust Point Matching (RPM) algorithm shown below, a well-known non-rigid registration algorithm in the computer vision field (see Chui, Haili, and Anand Rangarajan; "A new point matching algorithm for non-rigid registration"; Computer Vision and Image Understanding 89.2 (2003): 114-141). The TPS-RPM is a combination of two independent algorithms. The Robust Point Matching (RPM) that performs registration involves a dual update process (correspondence and transformation) embedded with an annealing scheme. This is combined with the Thin-Plate Spline (TPS) that acts as parametrization of the non-rigid spatial mapping. The TPS fits a mapping function between corresponding points sets by minimizing an energy function. The RPM transformation is then characterized as a thin-plate spline.

---
The TPS-RPM Algorithm Pseudo-code:
---
Initialize parameters T, $\lambda_1$ and $\lambda_2$.
Initialize parameters M, d and w.
Begin A: Deterministic Annealing.
  Begin B: Alternating Update.
    Step I: Update correspondence matrix M using (3), (4) and (5).
    Step II: Update transformation parameters (d, w) using (9).
  End B
  Decrease T, $\lambda_1$ and $\lambda_2$.
End A

---

Step 1: Update the Correspondence: For the points a=1, 2, . . . , K and i=1, 2, . . . , N, $$m_{ai} = \frac{1}{T} e^{-\frac{(x_i - f(v_a))^T (x_i - f(v_a))}{2T}} \quad (3)$$

and for the outlier entries a=K+1 and i=1, 2, . . . , N, $$m_{K+1,i} = \frac{1}{T_0} e^{-\frac{(x_i - v_{K+1})^T (x_i - v_{K+1})}{2T_0}} \quad (4)$$

and for the outlier entries a=1, 2, . . . K and i=N+1, $$m_{a,N+1} = \frac{1}{T_0} e^{-\frac{(x_{N+1} - f(v_a))^T (x_{N+1} - f(v_a))}{2T_0}} \quad (5)$$

Step 2: Update the Transformation: After dropping the terms independent of f, we need to solve the following least-squares problem, $$\min_f E(f) = \min_f \sum_{a=1}^{K} \|y_a - f(v_a)\|^2 + \lambda T \|Lf\|^2 \quad (9)$$

where $$y_a = \sum_{i=1}^{N} m_{ai} x_i \quad (10)$$

Non-rigid point set registration algorithm:

Initialization $W = 0$, $\sigma^2 = \frac{1}{DNM} \sum_{m,n=1}^{M,N} \|x_n - y_m\|^2$ Initialize $w(0 \leq w \leq 1)$, $\beta > 0$, $\lambda > 0$, Construct G: $g_{ij} = \exp^{-\frac{1}{2\beta^2} \|y_i - y_j\|^2}$, EM optimization, repeat until convergence:

E-step: Compute P, $$p_{mn} = \frac{\exp^{-\frac{1}{2\sigma^2}\|x_n-(y_m+G(m,\cdot)W)\|^2}}{\sum_{k=1}^{M} \exp^{-\frac{1}{2\sigma^2}\|x_n-(y_k+G(k,\cdot)W)\|^2} + \frac{w}{1-w}\frac{(2\pi\sigma^2)^{D/2}M}{N}}$$

M-step:

Solve $(G + \lambda\sigma^2 d(P1)^{-1})W = d(P1)^{-1}PX - Y$ $N_P = 1^T P1, T = Y + GW,$ $\sigma^2 = \frac{1}{N_P D}(tr(X^T d(P^T 1)X) - 2tr((PX)^T T) + tr(T^T d(P1)T)),$ The aligned point set is T=$\mathcal{T}$ (Y, W)=Y+GW,
The probability of correspondence is given by P.

This matching is seen as a probability density estimation problem where one set represents the Gaussian Mixture Model (GMM) and the other represents the data points. The objective is to fit the data points by maximizing the likelihood (Expectation Maximization algorithm shown above) and obtain the correspondence by using the posterior probabilities of the GMM components. In order to preserve the topological structure of the point set, the GMM are forced to move coherently as a group. This type of point set registration is called Coherent Point Drift (CPD) (see Myronenko and Song, "Point Set Registration: Coherent Point Drift"; arXiv:0905.2635). Once the two sets are superimposed, the matches are found by looking at the closest neighbors.

Figure 20:
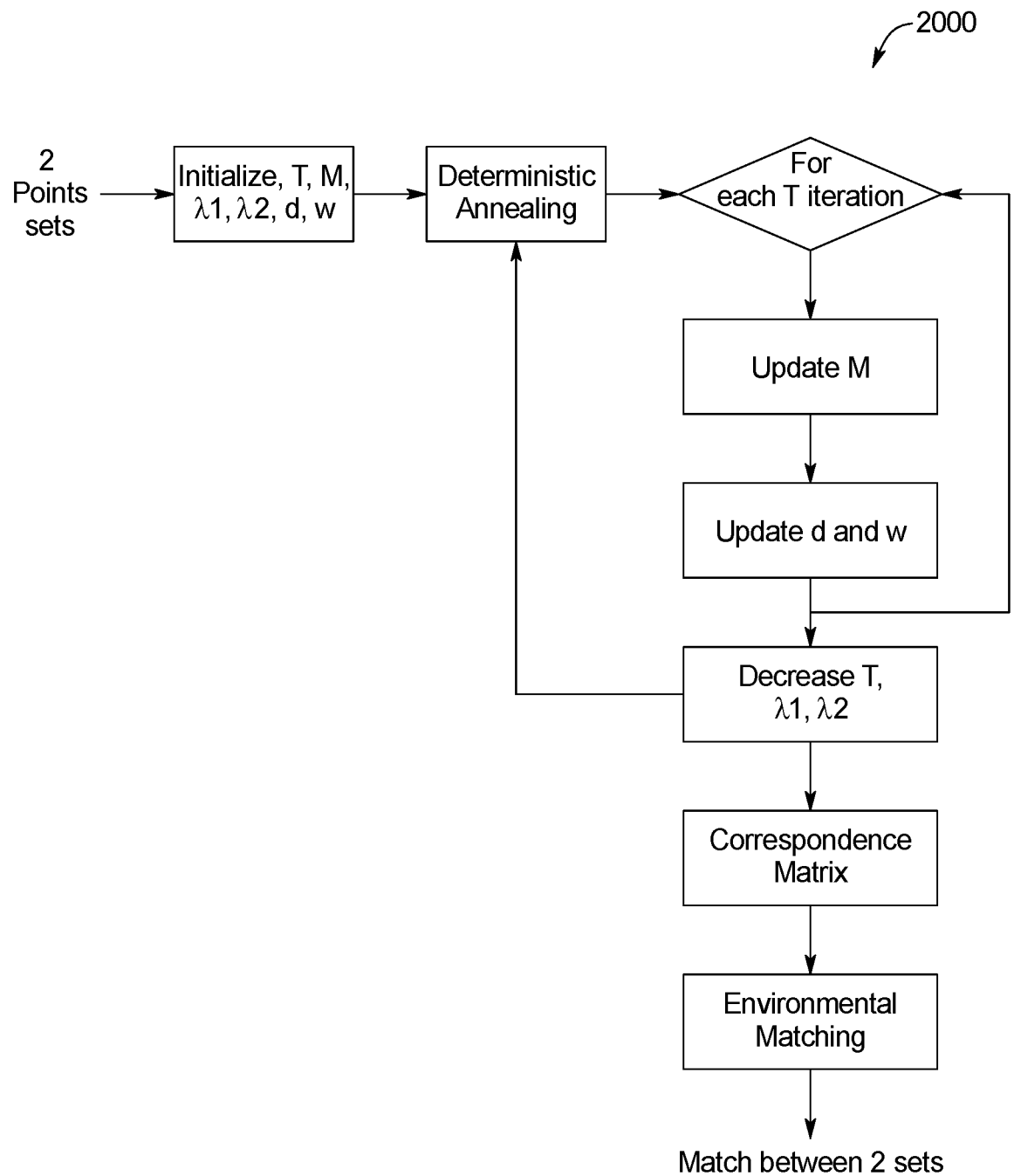
FIG. 20 is a block diagram of an example system for skin image matching of the skin abnormality monitoring system of FIG. 1.
Figure 21:
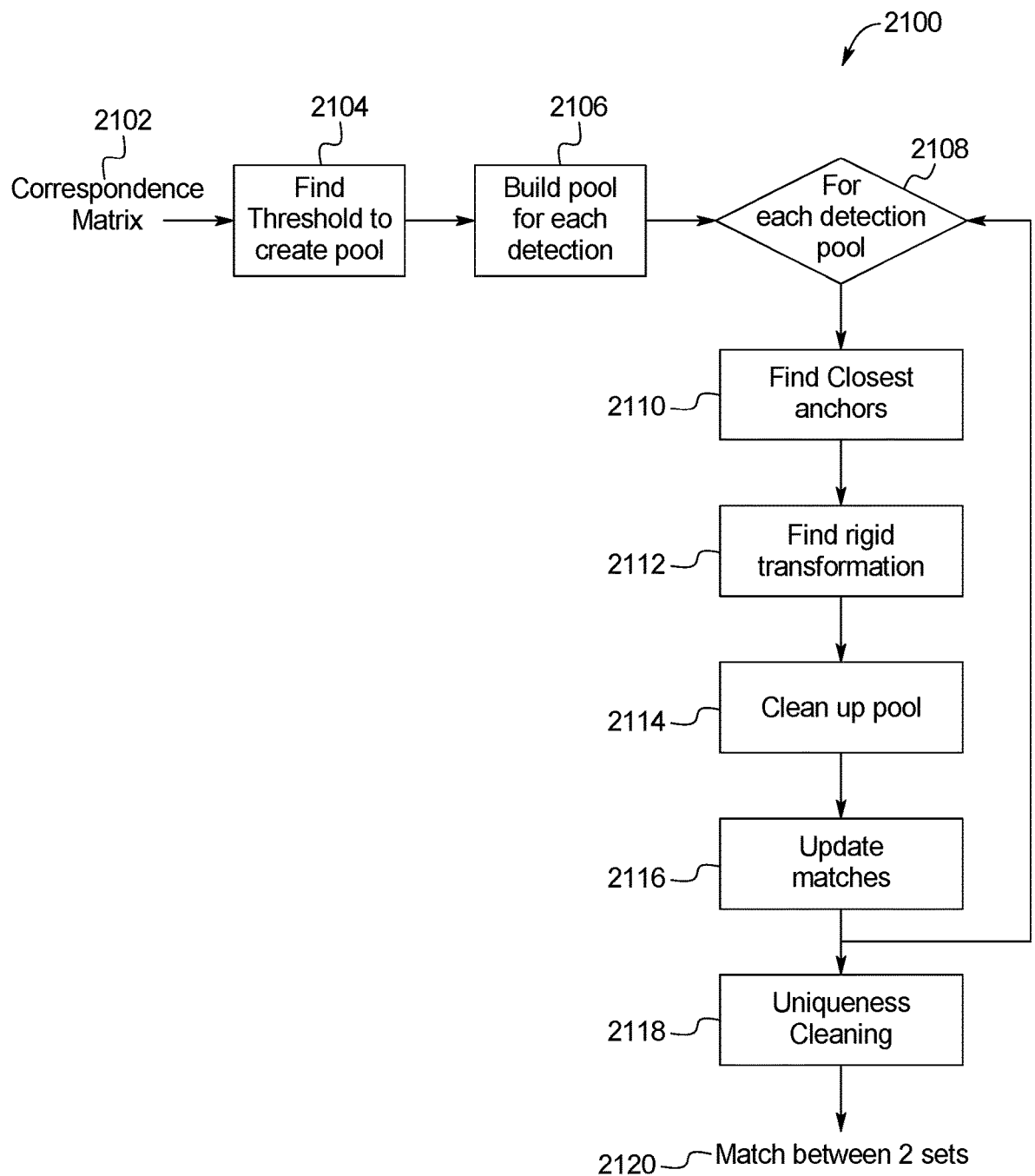
FIG. 21 is a block diagram of an example system for environmental matching between sets of keypoints in two temporally distinct photo sets of the skin abnormality monitoring system of FIG. 1.
Figure 22:
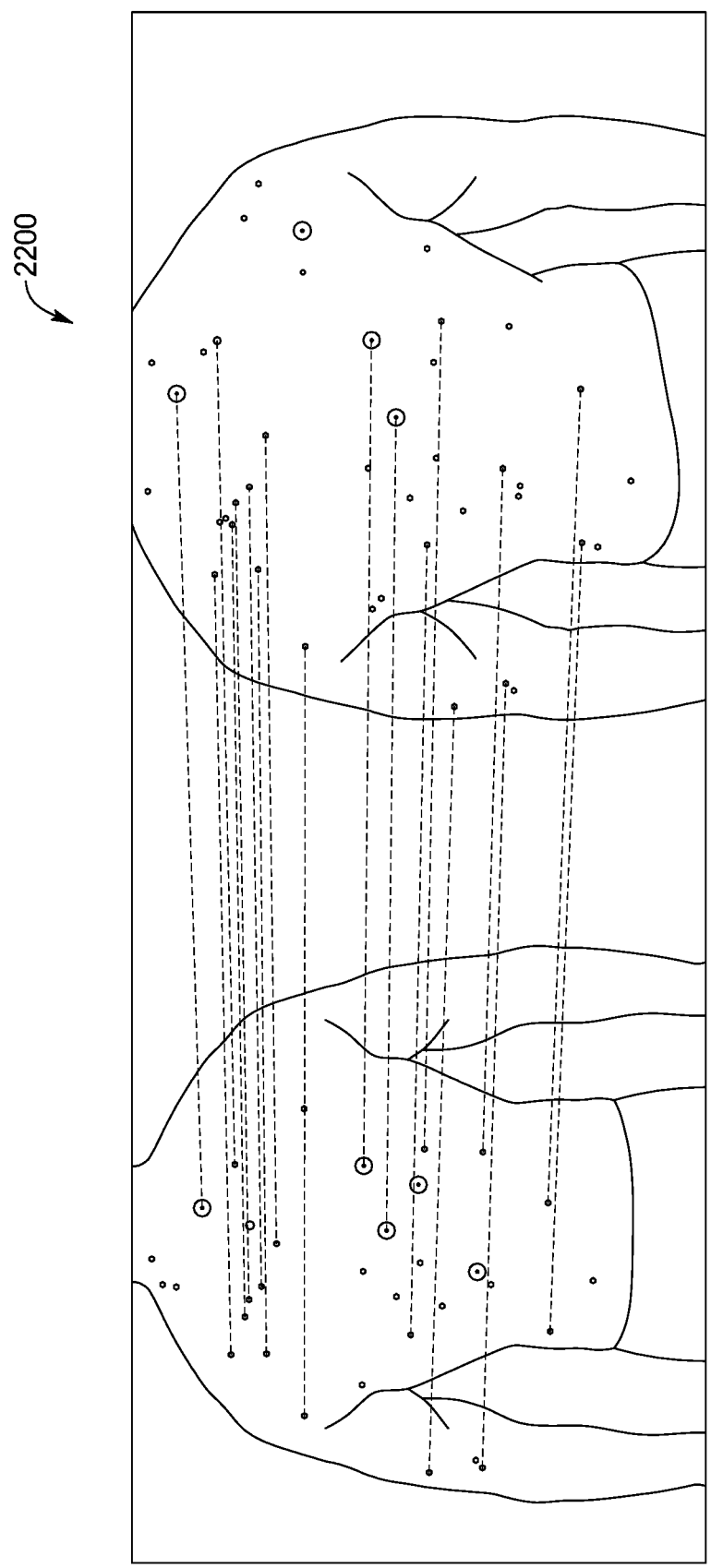
FIG. 22 shows an example output image of the systems of FIGS. 20 and 21 of the skin abnormality monitoring system of FIG. 1.

FIGS. 20 and 21 shows example methods 2000 and 2100, respectively, for close-up image matching. Specifically, FIG. 20 illustrates the iterative process 2000 for determining the coefficients used in the TPS-RPM algorithm described above. The method 2100 shown in FIG. 21 provides for environmental matching between sets of keypoints in two temporally distinct photo sets. A correspondence matrix is first initiated in step 2102, and a threshold to create the pool is determined in step 2104. The threshold is based on factors. Specifically, a histogram that represents the distribution of values with the correspondence matrix is drawn. Each value is between 0 and 1. In one embodiment, only values greater than 10^-21 are considered (anything smaller is considered 0). Beginning with bin 0, The sum of each bin is calculated beginning with bin 0, and the threshold is set when 10% of the total has accumulated. For example, for a 100 value, bin 0 is 5, bin −1 is 2, and bin −2 is 4 such that by bin −3, a total of 11 pixels have accumulated, hitting the minimum 10% threshold. In step 2106, a pool for each detection is built. In step 2108, one of the pools is identified. For each detection pool identified in step 1908, the closest anchors are found in step 2110 and the rigid transformation is determined in step 2112. In step 2114, the pool is cleared of unrelated detection data. In step 2116, the matches are updated. The process repeats steps 2108-2116 for each detection pool. Once each of the detection pools has been cleaned, the collection of detection pools is cleaned in step 2118 and a match is made in step 2120. FIG. 22 shows an example resulting image 2200 of the methods 2000, 2100.

Similarly to the keypoint classification network, manually labeled landmarks on body regions are firstly recorded as training data to fine-tune the same general object classification neural network model from literature. An example task is to identify shoulders in the head or torso regions. Instead of keypoints from mole localization, the input comes from cropped images taken along the skin mask contour, so that the coordinate at the shoulder curvature can be visually identified and recorded. Given the trained model, body landmark classification is made by taking many candidate coordinates and cropped images along the skin mask contour, and performing binary classification on whether the cropped region belongs to the shoulder. This process is repeated for any region on the set.

In order to stabilize matching, the algorithm adds landmarks and/or skin masks to the set of keypoints. Those landmarks cannot be computed using simply the polar coordinates as they depend on the anchor. Machine learning performed in earlier steps determines specific body landmarks (such as shoulders) whose purpose is to aid in the extrapolation of an anchor that is virtually placed in the same location on baseline and follow-up.

The extrapolation is a simple process that approximates body landmarks and the anchor on baseline as a triangle (angles and sides are estimated). Then on the follow-up image, the body landmarks serve as two vertices, the third one (anchor) is extrapolated using the lengths and angles from baseline. Once that anchor point is located, the process of landmark extraction remains the same.

Figure 23:
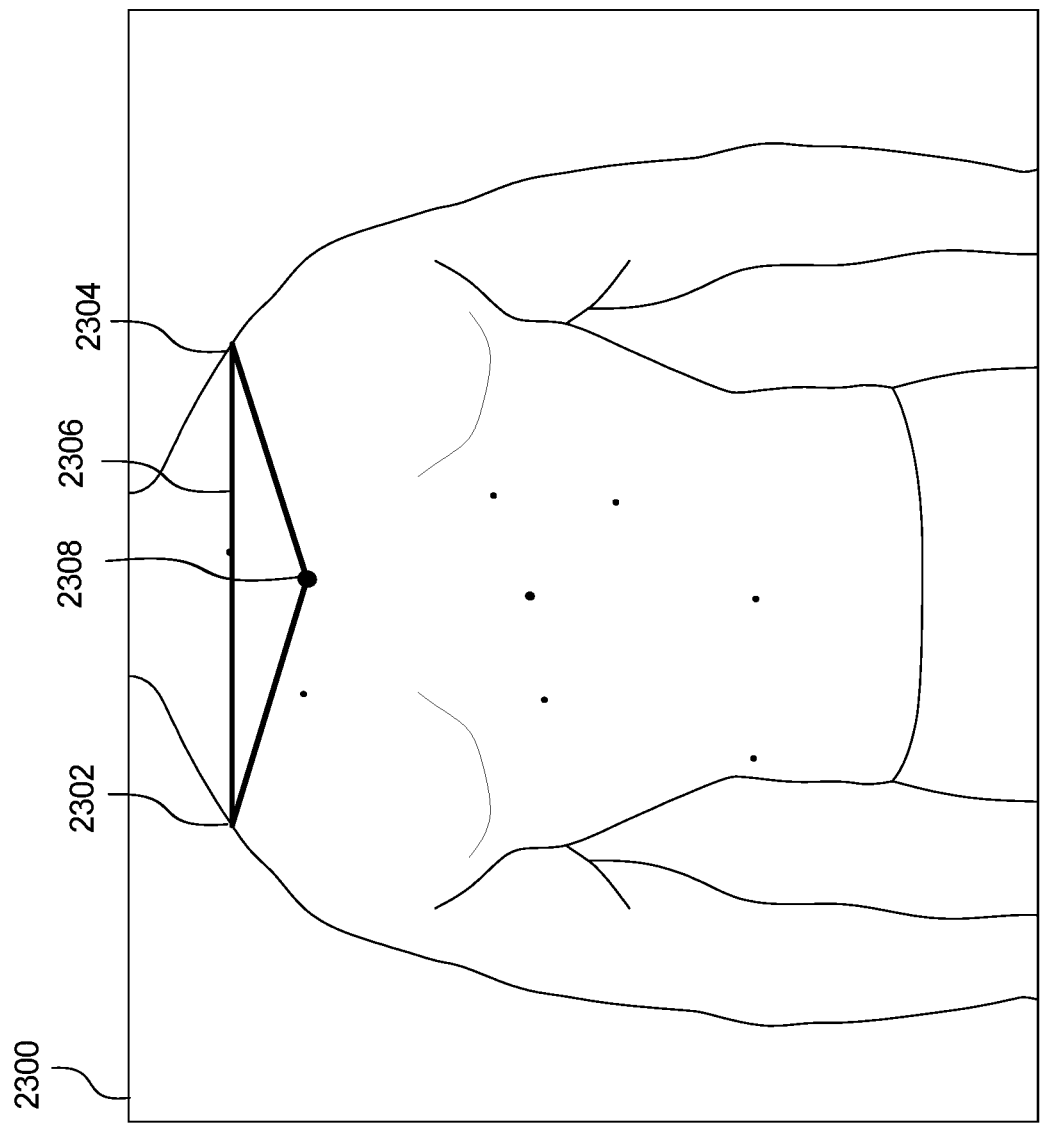
FIGS. 23 and 24 show example green dot extrapolation of the skin abnormality monitoring system of FIG. 1.
Figure 24:
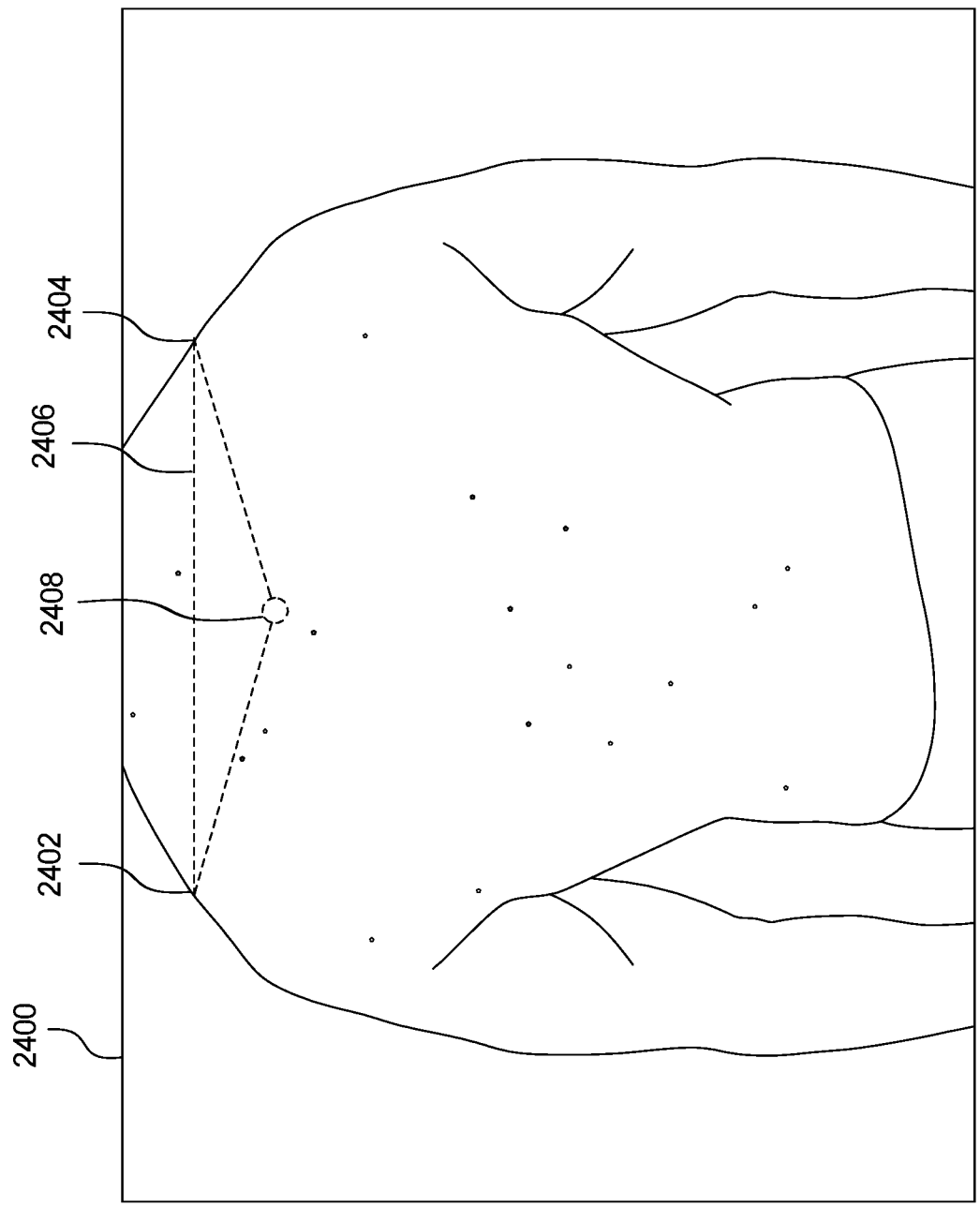

Green dot extrapolation is shown in FIGS. 23 and 24. In an image 2300, the shoulders of the patient are the body landmarks that serve as two vertices 2302, 2304 of a triangle 2306. The anchor 2308 is extrapolated. In a follow-up image 2400 of FIG. 24, the shoulders again serve as the two vertices 2402, 2404 of a triangle 2406, with the dotted circle 2408 as the extrapolated green dot. To compute the new green dot coordinates, the following assumptions were made: 1) the two images are present on the same plane; 2) the two triangles are similar (same angles and proportional sides); and 3) the transformation between the two triangles is a combination of a rotation of angle, a translation Tv and a homothety of ratio k.

If G is the new green dot, we can compute its coordinates by using the following formula:

$G(x,y)=(kx\cos(\ )-ky\sin(\ )+Tvx, kx\sin(\ )+ky\cos(\ )+Tvy)$

Figure 25:
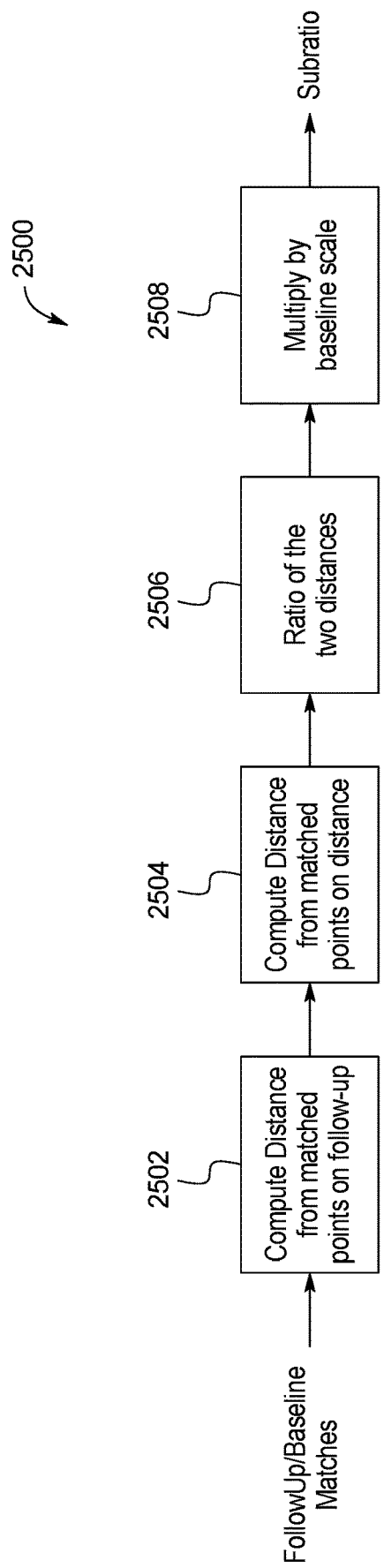
FIG. 25 is a block diagram of an example system for skin image subratio keypoint matching of the skin abnormality monitoring system of FIG. 1.

Referring back to FIG. 2, a subRatio calculation is applied to the image data in step 226. An example method 2500 of skin image subratio keypoint matching is shown in FIG. 25. Keypoints matching, described above, is applied between detection from the baseline set and detection from the follow-up picture being processed. Using those matches, the Euclidian distance between all the points that have a match in the follow-up is computed in step 2502. The same is done for the baseline set in step 2504. Undertaking the distance calculation for every matched point minimizes the error. The ratio between the two Euclidian distances is then calculated in step 2506 and finally that ratio is multiplied by the scale found for the baseline set in step 2508. That new ratio is called subRatio.

Following the subratio calculation, properties are generated for each spot in step 228. These properties include, but are not limited to: width, height, area, perimeter, dominant colors, and color sphere. Without the calculation of scale from the subratio step, only the color properties can be generated.

After Phase IV 202f and prior to the next step of finalizing the results (described below), the skin abnormality monitoring system 100 includes an optional intervention step 229 at which point the user may rerun any one or more of the matching step 224, the subRatio calculation step 226, and the properties calculation step 228, if desired. Optional intervention step 229 enables the system moderator or user to confirm the output of or to modify constants used in the analysis of the steps 224, 226, 228.

Referring again to FIG. 2, the image data is sent back to the original capture device upon request in step 230 of the Final Phase 202g. Notification systems exist to notify the original sender and associated medical staff of the results, but confidential medical data is not sent out of the system without explicit request. A user can then manipulate such photo data, query the results of the aforementioned process, and/or receive such photo data on the display of the device. Following the conclusion of property calculation, the final results are stored back in a database for final display to a user of the skin image processing system of FIG. 1 using the method described in FIG. 2, wherein the display device can be one or more of a known device, such as a tablet or mobile phone.

In the above examples, the embodiments of skin image capture and processing systems and methods may route any number of forms of data and information through the various implementations, aspects and embodiments of the systems and methods thereof. A number of programming languages and protocols are known or should be known to one skilled in the art, which could be suitable for use in the embodiments of the systems and methods herein.

Additionally, the technology introduced herein can be implemented by computing devices in numerous different forms. For example, the various systems and methods described herein can be realized in digital electronic circuitry, integrated circuitry, specially designed ASICs (application specific integrated circuits), computer hardware, FPGAs (field-programmable gate arrays), firmware, software, and/or combinations thereof. The various system implementations can include implementation in one or more software applications, executable and/or interpretable, on a programmable system including at least one programmable general or special purpose processor, coupled to receive data and instructions from, and to transmit data and instructions to, one or more storage systems, at least one input device and at least one output device.

Figure 26:
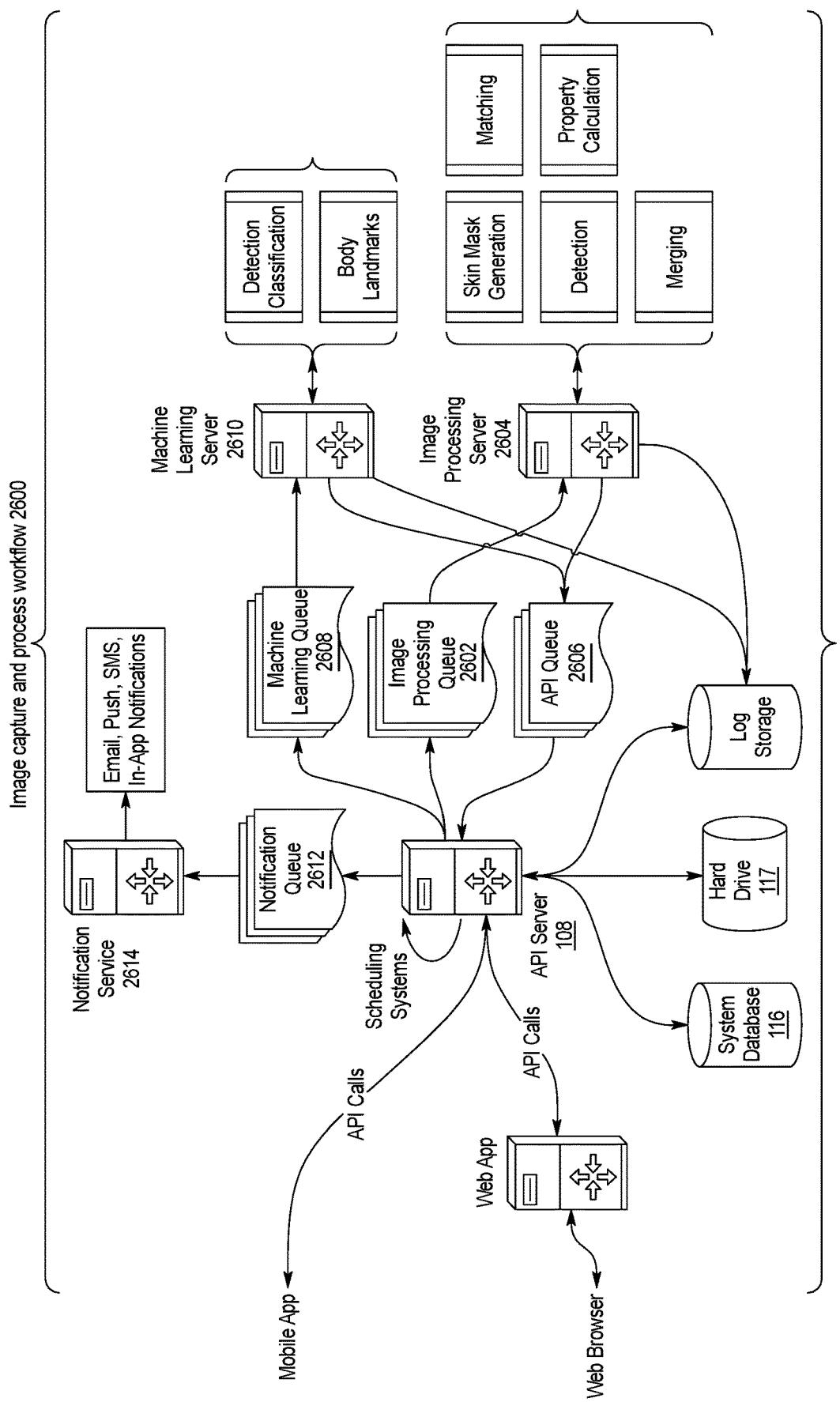
FIG. 26 is a schematic diagram of the image capture and processing workflow accomplished by the skin abnormality monitoring system of FIGS. 1.

FIG. 26 illustrates an embodiment of the image capture and processing workflow 2600 of the method 200 of processing and analyzing skin maps of a patient performed by the skin abnormality monitoring system 100. Throughout the workflow 2600, data is transmitted between the image capture device 102, user devices 104, and the API server 108 to perform front-end functionalities such as viewing patient data, uploading photos, changing settings, and managing accounts. Scheduling systems are maintained on the API server 108. Within the back end of the system 100, the management of the data may require specific organization and sequence of the process steps. The exemplary workflow 2600 shown in FIG. 2B may be modified as needed or desired to accommodate system changes or preferences.

Once the image data is sent to the API server 108 in step 204, the image data is sent to the image processing queue 2602 and subsequently the image processing server 2604, where the image data will undergo the skin mask localization step 210. The image data is then sent to the API queue 2606 for forwarding to the API server 108. Once passed through the API server 108, the image data is sent to the machine learning queue 2608 for forwarding to the machine learning server 2610 for the keypoints detection step 216 and the landmark determination step 218. Then the image data returns to the API queue 2606 for forwarding to the image processing server 2604 to undergo the merging step 220, the keypoints matching step 224, the subRatio calculation step 226, and the properties calculation step 228. The unused data from the keypoints detection step 216 and the landmark determination step 218 is sent directly to the database 116 and hard drive 117. Once the image data is finalized, the final results are sent to the database 116 or the hard drive 117. In one embodiment, the machine learning server 2610 is GPU-optimized, while the image processing server 2604 is CPU-optimized. In other embodiments, the steps 204-230 may be performed on any number of servers, including on a single server or more than two servers.

Throughout the process, reminders and alerts are sent to users utilizing various means of communications such as email, push notifications, short message service (SMS), and notifications used within the mobile application. Notifications may be automated based on the completion of steps within the skin abnormality monitoring system 100, or may be prompted by system administrators as needed. Notifications are forwarded to the notification queue 2612 and then passed to the notification server 2614. Notifications are sent form the notification server directly to the user.

One skilled in the art will appreciate the logic illustrated in each of the flow charts and diagrams discussed above may be altered in various ways. For example, the order of the logic may be rearranged, steps may be performed in parallel, illustrated logic may be omitted, and other logic may be included.

It is contemplated that the parts and features of any one of the embodiments described can be interchanged with the parts and features of any other of the embodiments without departing from the scope of the present disclosure. The foregoing description discloses and describes merely exemplary embodiments of the present disclosure and is not intended to be exhaustive or to limit the disclosure to the precise form disclosed. As will be understood by those skilled in the art, the disclosure may be embodied in other specific forms, or modified or varied in light of the above teachings, without departing from the spirit, novelty or essential characteristics of the present invention. Accordingly, the disclosed embodiments are intended to be illustrative, but not limiting, of the scope of the disclosure.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A process for determining one or more outlier lesions, the process comprising the steps of:
   receiving a plurality of image data from an image capture device, wherein each image data includes a skin portion, wherein each image data of the plurality of image data comprises a different skin image of the skin portion, the skin portion including a plurality of lesions;
   extracting, via a machine learning system, a first set of information associated with each image data in the plurality of image data;
   extracting, via the machine learning system, a second set of information associated with each image data in the plurality of image data;
   determining a plurality of vector representations for each set of information associated with each image data in the plurality of image data;

determining an average vector based on the plurality of vector representations across the plurality of image data of the skin portion;

calculating a normalized distance metric based on the plurality of vector representations and the average vector; and analyzing the plurality of lesions to identify one or more outlier lesions within the plurality of lesions based on the normalized distance metric.

2. The process of claim 1, wherein a subset of the plurality of image data includes a lesion of the plurality of lesions.

3. The process of claim 2, further comprising the step of cropping each image of the subset around the respective lesion of the image.

4. The process of claim 1, wherein the plurality of vector representations for each set of information includes 1024 numerical values.

* * * * *